(12) United States Patent
Springer

(10) Patent No.: US 9,440,835 B2
(45) Date of Patent: Sep. 13, 2016

(54) FLUID TRANSFER ASSEMBLY AND METHODS OF FLUID TRANSFER

(71) Applicant: Grinon Industries, Indianapolis, IN (US)

(72) Inventor: Joshua Springer, Indianapolis, IN (US)

(73) Assignee: GrinOn Industries, Indianapolis, IN (US)

( * ) Notice: Subject to any disclaimer, the term of this patent is extended or adjusted under 35 U.S.C. 154(b) by 129 days.

(21) Appl. No.: 14/328,375

(22) Filed: Jul. 10, 2014

(65) Prior Publication Data

US 2014/0332113 A1 Nov. 13, 2014

Related U.S. Application Data

(60) Division of application No. 13/008,786, filed on Jan. 18, 2011, now Pat. No. 8,777,182, which is a continuation-in-part of application No. 12/992,881, filed as application No. PCT/US2009/044534 on May 19, 2009, now Pat. No. 8,763,655.

(60) Provisional application No. 61/154,726, filed on Feb. 23, 2009, provisional application No. 61/054,686, filed on May 20, 2008, provisional application No. 61/296,305, filed on Jan. 19, 2010.

(51) Int. Cl.
*B67C 3/26* (2006.01)
*A47G 19/22* (2006.01)
(Continued)

(52) U.S. Cl.
CPC ............ *B67C 3/264* (2013.01); *A47G 19/2205* (2013.01); *B65D 1/06* (2013.01); *B67D 1/0007* (2013.01); *B67D 1/0085* (2013.01); *B67D 1/07* (2013.01); *B67D 1/0877* (2013.01); *B67D 1/0888* (2013.01); *B67D 1/0894* (2013.01);
(Continued)

(58) Field of Classification Search
CPC ........ B67C 3/264; B67D 1/06; B67D 1/124; B67D 1/0007; B67D 1/1236; B67D 1/0894; B67D 1/0888; B67D 1/07; B67D 1/1272; B67D 1/0085; B67D 1/0877; F16K 31/10; F16K 27/07; A47G 19/2205
See application file for complete search history.

(56) References Cited

U.S. PATENT DOCUMENTS 629,754 A 7/1899 Popham
3,026,903 A 3/1962 Roach
(Continued)

FOREIGN PATENT DOCUMENTS

CN 2 058 098 U 6/1990
CN 1237137 A 12/1999
(Continued)

OTHER PUBLICATIONS

CN 200980128499.1 filed Jan. 20, 2011 Fifth Office Action dated Nov. 24, 2014.
(Continued)

*Primary Examiner* — Timothy L Maust
(74) *Attorney, Agent, or Firm* — Rutan & Tucker, LLP

(57) ABSTRACT

A fluid dispensing assembly, including a valve, a housing, a user interface, and a fitting to couple to a fluid source. The valve may include a first sensor detecting proper placement of the fluid container based on a magnetic material positioned at the bottom of the fluid container, a plunger having a plunger shaft coupled thereto, the plunger selectively placing the valve in fluid communication with the fluid container, and a solenoid coupled to the plunger shaft and moving the plunger shaft to transition the plunger between an open position and a closed position. The user interface may be coupled to the valve to enable selection of at least a fluid container size and a dispensing mode.

11 Claims, 29 Drawing Sheets

(51) Int. Cl.

| | | |
|---|---|---|
| *B67D 1/00* | (2006.01) | |
| *B67D 1/07* | (2006.01) | |
| *B67D 1/08* | (2006.01) | |
| *B67D 1/12* | (2006.01) | |
| *F16K 27/07* | (2006.01) | |
| *B65D 1/06* | (2006.01) | |
| *F16K 31/10* | (2006.01) | |
| *B67D 1/14* | (2006.01) | |

(52) U.S. Cl.
CPC ............ *B67D 1/124* (2013.01); *B67D 1/1236* (2013.01); *B67D 1/1272* (2013.01); *F16K 27/07* (2013.01); *F16K 31/10* (2013.01); *B67D 2001/1483* (2013.01); *Y10T 137/7786* (2015.04)

(56) References Cited

U.S. PATENT DOCUMENTS

| | | | |
|---|---|---|---|
| 3,212,539 A | 10/1965 | Felix | |
| 3,265,102 A | 8/1966 | Yoshinaga | |
| 3,463,257 A | 8/1969 | Inomata et al. | |
| 3,718,165 A | 2/1973 | Grothoff | |
| 3,893,651 A | 7/1975 | Uecker | |
| 4,133,354 A | 1/1979 | Lerner et al. | |
| 4,197,884 A | 4/1980 | Maran | |
| 4,261,485 A | 4/1981 | Borg | |
| 4,662,271 A | 5/1987 | Woltermann | |
| 4,712,595 A | 12/1987 | Wilson | |
| 4,804,116 A | 2/1989 | Ball | |
| 4,832,312 A | 5/1989 | Linder et al. | |
| 4,877,065 A | 10/1989 | Lamboy et al. | |
| 4,984,549 A * | 1/1991 | Mesenich | F02M 51/0625 123/472 |
| 5,312,019 A | 5/1994 | Tsao | |
| 5,343,904 A | 9/1994 | Kaeser | |
| 5,381,926 A | 1/1995 | Credle, Jr. et al. | |
| 5,609,195 A | 3/1997 | Stricklin et al. | |
| 5,649,575 A | 7/1997 | Till | |
| 5,653,270 A | 8/1997 | Burrows | |
| 5,782,263 A * | 7/1998 | Isaacson, Jr. | F16K 17/20 137/459 |
| 6,056,026 A * | 5/2000 | Fosnight | H01L 21/67393 141/98 |
| 6,349,854 B1 | 2/2002 | Bierend et al. | |
| 6,725,877 B2 * | 4/2004 | Liorati | F16K 31/0651 137/486 |
| 6,772,807 B1 | 8/2004 | Tang | |
| 6,837,271 B1 * | 1/2005 | Saint | G01M 3/2807 137/460 |
| 6,883,564 B2 | 4/2005 | Risch et al. | |
| 7,021,603 B2 * | 4/2006 | Wygnaski | F16K 31/0682 251/129.15 |
| 7,225,839 B2 | 6/2007 | Mackenzie et al. | |
| 7,299,956 B2 | 11/2007 | Haglund et al. | |
| 7,506,663 B2 | 3/2009 | Thomas et al. | |
| 7,546,855 B2 | 6/2009 | Rodewald | |
| 7,690,625 B2 | 4/2010 | Sabiron et al. | |
| 7,708,035 B2 | 5/2010 | Windmiller | |
| 7,753,231 B2 | 7/2010 | Giles et al. | |
| 7,766,057 B2 | 8/2010 | Windmiller | |
| 7,824,545 B2 | 11/2010 | Windmiller | |
| 8,082,956 B2 | 12/2011 | Windmiller | |
| 8,113,247 B2 | 2/2012 | Windmiller | |
| 8,151,838 B2 | 4/2012 | Seaborne et al. | |
| 8,215,344 B2 | 7/2012 | Windmiller | |
| 8,763,655 B2 | 7/2014 | Springer | |
| 8,777,182 B2 | 7/2014 | Springer | |
| 2002/0148529 A1 | 10/2002 | Berndorfer et al. | |
| 2004/0060888 A1 | 4/2004 | Ahn | |
| 2004/0064989 A1 | 4/2004 | Nottage et al. | |
| 2005/0104035 A1 | 5/2005 | Eaddy et al. | |
| 2008/0017256 A1 | 1/2008 | Thomas et al. | |
| 2008/0223478 A1 | 9/2008 | Hantsoo et al. | |
| 2008/0251533 A1 | 10/2008 | Giles et al. | |
| 2008/0302711 A1 | 12/2008 | Windmiller | |
| 2009/0238926 A1 | 9/2009 | Hara et al. | |
| 2010/0043911 A1 | 2/2010 | Russell | |
| 2011/0061764 A1 | 3/2011 | Springer | |
| 2011/0121020 A1 | 5/2011 | Springer | |
| 2011/0240170 A1 | 10/2011 | Fallon et al. | |
| 2012/0207960 A1 | 8/2012 | Finger | |
| 2012/0211461 A1 | 8/2012 | Windmiller | |
| 2013/0118639 A1 | 5/2013 | Springer | |
| 2014/0166524 A1 | 6/2014 | Springer | |

FOREIGN PATENT DOCUMENTS

| | | |
|---|---|---|
| CN | 1273627 A | 11/2000 |
| CN | 102099251 A | 6/2011 |
| CN | 102803073 A | 11/2012 |
| CN | 202714614 U | 2/2013 |
| CN | 203059203 U | 7/2013 |
| DE | 1255531 B | 11/1967 |
| DE | 3601765 A1 | 7/1987 |
| EP | 0089064 A1 | 9/1983 |
| EP | 2285687 A1 | 2/2011 |
| EP | 2526020 A1 | 11/2012 |
| FR | 2 380 479 A1 | 9/1978 |
| JP | 55-84356 U | 6/1980 |
| JP | 01-182252 A | 7/1989 |
| JP | 07-009458 A | 1/1995 |
| JP | 08-230988 A | 9/1996 |
| JP | 2004338749 A | 12/2004 |
| JP | 2005133744 A | 5/2005 |
| JP | 2007 198567 A | 8/2007 |
| JP | 2013-517188 A | 5/2013 |
| JP | 05501840 B2 | 5/2014 |
| KR | 101243382 B1 | 3/2013 |
| KR | 20130125634 A | 11/2013 |
| NZ | 589747 A | 4/2012 |
| WO | 91/02694 A1 | 3/1991 |
| WO | 9814387 A1 | 4/1998 |
| WO | 9905446 A1 | 2/1999 |
| WO | 2004090394 A1 | 10/2004 |
| WO | 2006055866 A1 | 5/2006 |
| WO | 2007102139 A1 | 9/2007 |
| WO | 2007141719 A1 | 12/2007 |
| WO | 2008011240 A2 | 1/2008 |
| WO | 2009143164 A1 | 11/2009 |
| WO | 2011091047 A1 | 7/2011 |
| WO | 2013102130 A1 | 7/2013 |

OTHER PUBLICATIONS

CN 201180012752.4 filed Sep. 6, 2012 Fourth Office Action dated Aug. 31, 2015.
CN 201180012752.4 filed Sep. 6, 2012 Third Office Action dated Feb. 9, 2015.
EP 11 735 120.5 filed Aug. 6, 2012 Examination Report dated Feb. 6, 2015.
JP 2013-192622 filed Sep. 18, 2013 Office Action dated Jun. 30, 2015.
JP 2013-192622 filed Sep. 18, 2013 Office Action dated Oct. 7, 2014.
NZ 626944 filed Jul. 1, 2014 First Examination Report dated Feb. 12, 2015.
NZ 626944 filed Jul. 1, 2014 Second Examination Report dated Jul. 23, 2015.
RU 2012134034 filed Aug. 8, 2012 Office Action dated Jan. 29, 2015.
U.S. Appl. No. 13/730,549, filed Dec. 28, 2012 Non-Final Office Action dated Aug. 5, 2015.
U.S. Appl. No. 13/730,549, filed Dec. 28, 2012 Non-Final Office Action dated Mar. 12, 2015.
U.S. Appl. No. 14/185,734, filed Febuary 20, 2014 Non-Final Office Action dated Dec. 14, 2015.
CA 2,723,979 filed Nov. 16, 2010 Second Examiner's Report dated Jul. 22, 2014.
CN 201180012752.4 filed Sep. 6, 2012 First Office Action dated Jun. 17, 2014.

(56) References Cited

OTHER PUBLICATIONS

EP 09 751 392.3 filed Nov. 18, 2010 Extended European Search Report dated Sep. 12, 2014.
PCT/US2012/072155 filed Dec. 28, 2012 International Preliminary Report on Patentability dated Jul. 1, 2014.
AU 20099249194 filed May 19, 2009 Examiner's Report dated Aug. 22, 2011.
AU 2011206946 filed May 19, 2009 First Examiner's Report dated Feb. 23, 2012.
AU 2011206946 filed May 19, 2009 Notice of Acceptance dated May 21, 2012.
AU 2011207545 filed Jul. 17, 2012 First Examination Report dated Jan. 15, 2014.
CA 2,723,979 filed Nov. 16, 2010 First Examiner's Report dated Nov. 18, 2013.
CN 200980128499.1 filed Jan. 20, 2011 First Office Action dated Oct. 10, 2012.
CN 200980128499.1 filed Jan. 20, 2011 Fourth Office Action dated May 15, 2014.
CN 200980128499.1 filed Jan. 20, 2011 Second Office Action dated May 21, 2013.
CN 200980128499.1 filed Jan. 20, 2011 Third Office Action dated Nov. 27, 2013.
CN 201180012752.4 filed Sep. 6, 2012 First Office Action dated Nov. 5, 2013.
EP 11 735 120.5 filed Aug. 6, 2012 Examination Report dated May 19, 2014.
EP 11 735 120.5 filed Aug. 6, 2012 Extended European Search Report dated Jul. 31, 2013.
JP 2011-510651 Office Action dated Mar. 19, 2013.
NZ 601287 filed Jul. 17, 2012 First Examination Report dated Apr. 26, 2013.
NZ 604017 filed Dec. 5, 2012 First Examination Report dated Dec. 17, 2012.
NZ 604017 filed Dec. 5, 2012 Further Examination Report dated May 27, 2013.
NZ Application 589747 filed May 9, 2009 First Examination Report dated Dec. 5, 2011.
NZ Application 589747 filed May 9, 2009 Notice of Acceptance dated Feb. 15, 2013.
NZ Application 621685 filed Feb. 25, 2014 First Examination Report dated Mar. 17, 2014.
NZ Application No. 598,817 filed May 19, 2009 Examination Report dated Mar. 16, 2012.
PCT/US2009/044534 filed May 19, 2009 Search Report dated Jul. 14, 2009.
PCT/US2009/044534 filed May 19, 2009 Written Opinion dated Jul. 14, 2009.
PCT/US2011/021730 filed Jan. 19, 2011 International Search Report dated Apr. 1, 2011.
PCT/US2011/021730 filed Jan. 19, 2011 Written Opinion dated Apr. 1, 2011 and International Preliminary Report on Patentability dated Aug. 2, 2012.
PCT/US2012/072155 filed Dec. 28, 2012 International Search Report and Written Opinion dated Mar. 18, 2013.
RU 2011103071 filed May 19, 2009 Office Action dated May 13, 2013.
U.S. Appl. No. 12/992,881, filed Nov. 19, 2010 Non-Final Office Action dated May 15, 2013.
U.S. Appl. No. 12/992,881, filed Nov. 19, 2010 Non-Final Office Action dated Oct. 17, 2013.
U.S. Appl. No. 13/008,786, filed Jan. 18, 2011 Notice of Allowance dated Nov. 19, 2013.
AU 2012362224 filed Jun. 30, 2014 Examination Report dated May 3, 2016.
CN 201510300462.X filed May 19, 2015 Office Action dated Mar. 23, 2016.
U.S. Appl. No. 14/185,734, filed Febuary 20, 2014 Final Office Action dated Apr. 15, 2016.
CN201280070695.X filed on Aug. 26, 2014 Second Office Action dated Feb. 15, 2016.
CN201280070695.X filed on Aug. 26, 2014, First Office Action dated Jun. 3, 2015.
EP 12 861 336.1 filed Jul. 28, 2014 Extended European Search Report dated Jul. 17, 2015.
EP 15177860.2 filed Jul. 22, 2015 Extended European Search Report dated Nov. 5, 2015.

* cited by examiner

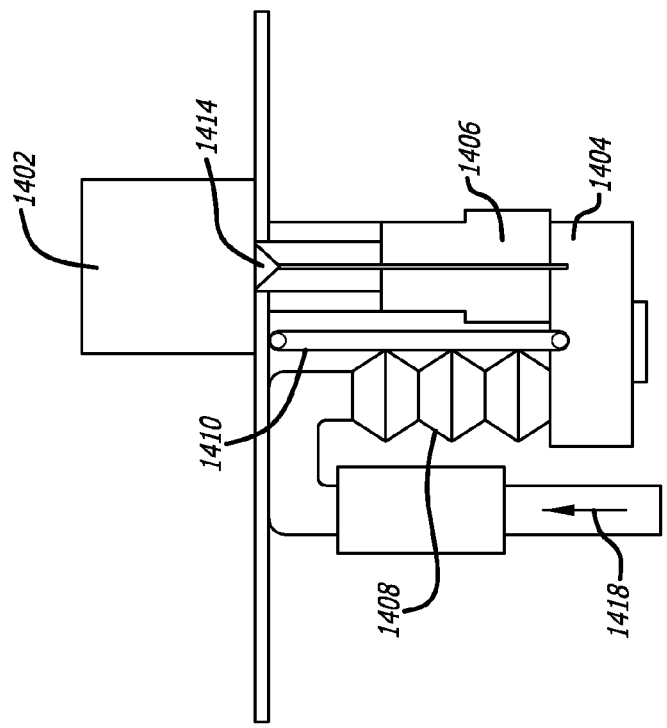
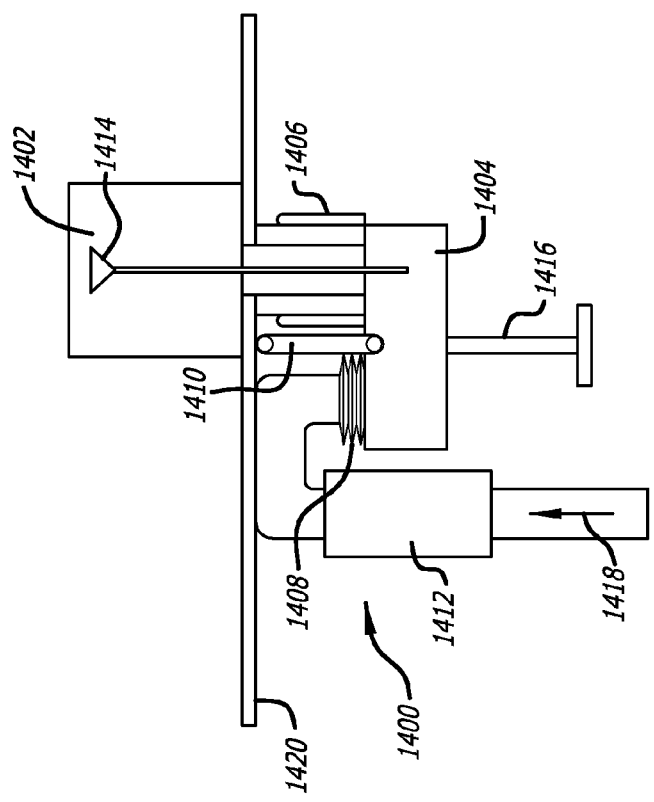

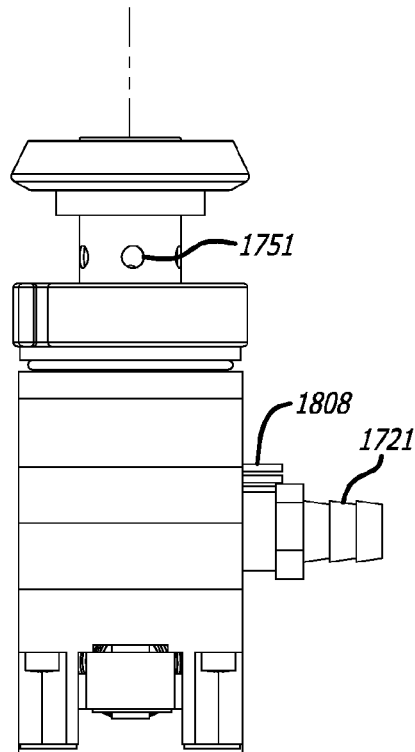
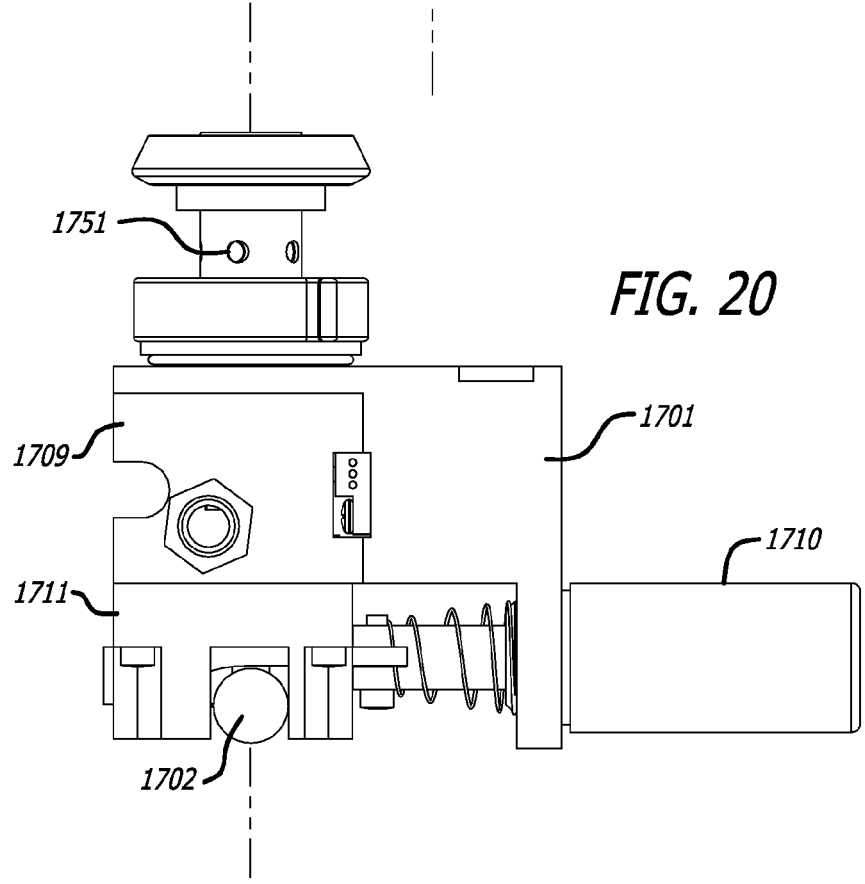

FLUID TRANSFER ASSEMBLY AND METHODS OF FLUID TRANSFER

PRIORITY

This application is a division of U.S. patent application Ser. No. 13/008,786, filed Jan. 18, 2011, now U.S. Pat. No. 8,777,182, which claims priority to U.S. Provisional Patent Application No. 61/296,305, filed Jan. 19, 2010, and which is a continuation-in-part of U.S. patent application Ser. No. 12/992,881, filed as a U.S. national stage application under 35 USC §371 of International Application No. PCT/US2009/044534, filed May 19, 2009, now U.S. Pat. No. 8,763,655, which claims priority to U.S. Provisional Patent Application No. 61/054,686, filed May 20, 2008, and to U.S. Provisional Patent Application No. 61/154,726, filed Feb. 23, 2009, each of which aforementioned applications is incorporated by reference in its entirety into this application.

BACKGROUND

Various types of containers are designed to hold beverages, from cans and bottles, to cardboard boxes and wooden casks. Liquid may be stored in large containers and transferred to relatively smaller containers for consumption via a spout, hose, faucet, tap, or fountain. Such transfer methods fill a serving container from the top of the serving container, or through the surface of the filled liquid in the serving container. However, filling a serving container from the top may increase foam of carbonated beverages. To reduce the foam, a user generally pours out the excess from the serving container, thereby wasting liquid. Alternatively, a user may wait for the foam to settle, which requires extra serving time and attention.

Accordingly, top filling methods generally require a server to perform a number of actions, including properly positioning the serving container, starting the flow of liquid, stopping the flow of liquid, and removing the serving container, each action requiring coordination and usually physical contact with the serving container during the filling process. Moreover, transfer devices for top filling methods often take a large amount of space on a counter or serving area, and require attention to operate and control.

The following references relate to containers and devices for bottom-up filling: International Publication No. WO 2007/102139 to Charles, and U.S. Patent Application Publication No. US 2008/0223478 to Hantsoo et al., each of which is incorporated by reference in its entirety into this application.

BRIEF SUMMARY

A dispensing system as described herein permits a serving container to be filled through a bottom thereof. The dispensing system may include a container connection device coupled to the bottom of the container. The container connection device includes a valve to permit fluid flow through the bottom during a filling process, which provides a fluid tight seal after disconnecting from a dispensing connection device. The dispensing connection device may be coupled to a fluid source to provide a fluid to fill the container. The dispensing connection device and container connection device are configured to mate and provide a fluid flow path between a filling source and the container. The dispensing system may include additional features, such as, for example, a basin, drain, advertising space, lights, etc.

In one embodiment, the dispensing system may include a flushing system. The flushing system may remove liquid from the dispenser connection device after a container is removed. Removing the liquid may reduce the potential for stale liquid to accumulate in the dispenser connection device between fillings. The flushing system may flush the dispenser connection device with a cleansing fluid, such as, for example, water, alcohol, or air to remove the liquid from the dispenser connection device between uses.

In one embodiment, a removal system permits rapid draining of a container through its bottom. The removal system may be coupled to the container connection device to permit rapid removal of the previously filled fluid of the container. The removal system may open a valve of the container connection device and create a fluid flow path from the container to the end of the removal system.

In one embodiment, a fluid transfer assembly includes a fluid container having an opening in a bottom thereof, a coupling device attached to the fluid container at the opening, the coupling device including a valve biasing the coupling device in a closed fluid-tight position via magnetic attraction of opposing first and second components, each of the opposing first and second components including a magnetic material, and a filling device including a rigid member with a perimeter smaller than a perimeter of the fluid container opening, the rigid member including a passage along a longitudinal axis and one or more apertures through a sidewall in fluid communication with the passage, wherein the coupling device is transitioned from the closed fluid-tight position to an open position by pressing the rigid member against one of the opposing first and second components to place the apertures in fluid communication with an interior of the fluid container.

In another embodiment, a dispenser connection device includes a nozzle including a passage along a longitudinal axis and one or more apertures through a sidewall in fluid communication with the passage, a platform surrounding the nozzle including an opening larger than a perimeter of the nozzle, the nozzle positioned in the opening, the platform including a magnetic material at least partially surrounding the opening, and a flexible collar member attached to the platform, translating the dispenser connection device between a closed position, wherein the flexible collar member and/or the platform cover the one or more apertures of the nozzle, and an open position, wherein at least a portion of the one or more apertures are uncovered.

In yet another embodiment, a beverage dispensing system includes a container including a valve biasing an opening in the bottom of the container in a closed position, the valve including a magnetic cap, a nozzle including a magnetic material on or adjacent a top surface thereof, the nozzle magnetic material having sufficient strength to hold the magnetic cap of the valve such that movement between the nozzle and cap are prevented upon contact of the top surface of the nozzle with the magnetic cap, and a platform circumferentially surrounding a portion of the nozzle, the platform translating along a longitudinal axis of the nozzle.

In another embodiment, a fluid container includes an opening in a bottom surface thereof, and a coupling device connected to the bottom surface of the container around the opening, the coupling device including a first component in contact with the bottom surface of the fluid container around the opening, the first component including a magnetic material, and a second component in contact with the first component in a fluid-tight closed configuration, the second component including a magnetic material, a top surface of the second component viewable from a top of the fluid container including a personal or commercial message, the coupling device biased in the fluid-tight closed configuration via magnetic attraction of the first component and the second component.

In still another embodiment, a removal system to remove a beverage from an attached container includes a base configured to mate with a bottom of the attached container, fingers projecting from the base to open a valve on the bottom of the attached container when the drainage system is coupled to the attached container, and a conduit coupled to the base, from an opposite side than the fingers to direct the beverage from the attached container to a desired location.

In one embodiment, a method of fluid transfer includes providing a filling device including a nozzle and a platform surrounding the nozzle, the nozzle having a passage along a longitudinal axis and one or more apertures through a sidewall in fluid communication with the passage, the platform translating along the longitudinal axis of the nozzle, positioning a fluid container over the filling device, the fluid container including an opening in a bottom thereof and a coupling device biasing the opening in a closed fluid-tight position by magnetic attraction of opposing separable first and second components, each of the opposing separable first and second components including a magnetic material, aligning the fluid container coupling device with the filling device platform, and contacting the platform with an exterior surface of the coupling device to translate the platform along the nozzle longitudinal axis, the nozzle separating the first component from the second component to place the apertures in fluid communication with an interior of the fluid container.

In one embodiment, a dispensing system is provided to dispense a fluid into a coupled fluid container through its base. The dispensing system includes a valve which includes a container sensor, a fluid sensor, and an actuator assembly to control the dispensing of the fluid. The dispensing system may include a user interface to enable a user to select a filling mode and a filling size. The dispensing system may also include a processor configured to receive signals from the container sensor and the fluid sensor, and to send signals to the actuator assembly. The actuator assembly is coupled to a plunger and movement of a solenoid in the actuator assembly may cause the plunger to open and allow the fluid flow or close and stop the fluid flow. The valve may also include a turbine coupled to the fluid sensor to determine a fluid flow rate so that the dispensing system may be run automatically to fill the coupled fluid container.

BRIEF DESCRIPTION OF THE DRAWINGS

The multiple drawings refer to the embodiments of the invention. While embodiments of the invention described herein are subject to various modifications and alternative forms, specific embodiments thereof have been shown by way of example in the drawings and will herein be described in detail.

FIGS. 14A-B illustrate one embodiment of a flushing device to remove liquid from the dispensing system after use.

FIG. 19 illustrates a representative rear elevation of a valve of a dispensing system, in accordance with some embodiments.

FIG. 20 illustrates a representative left side elevation of a valve of a dispensing system, in accordance with some embodiments.

DETAILED DESCRIPTION

Figure 1:
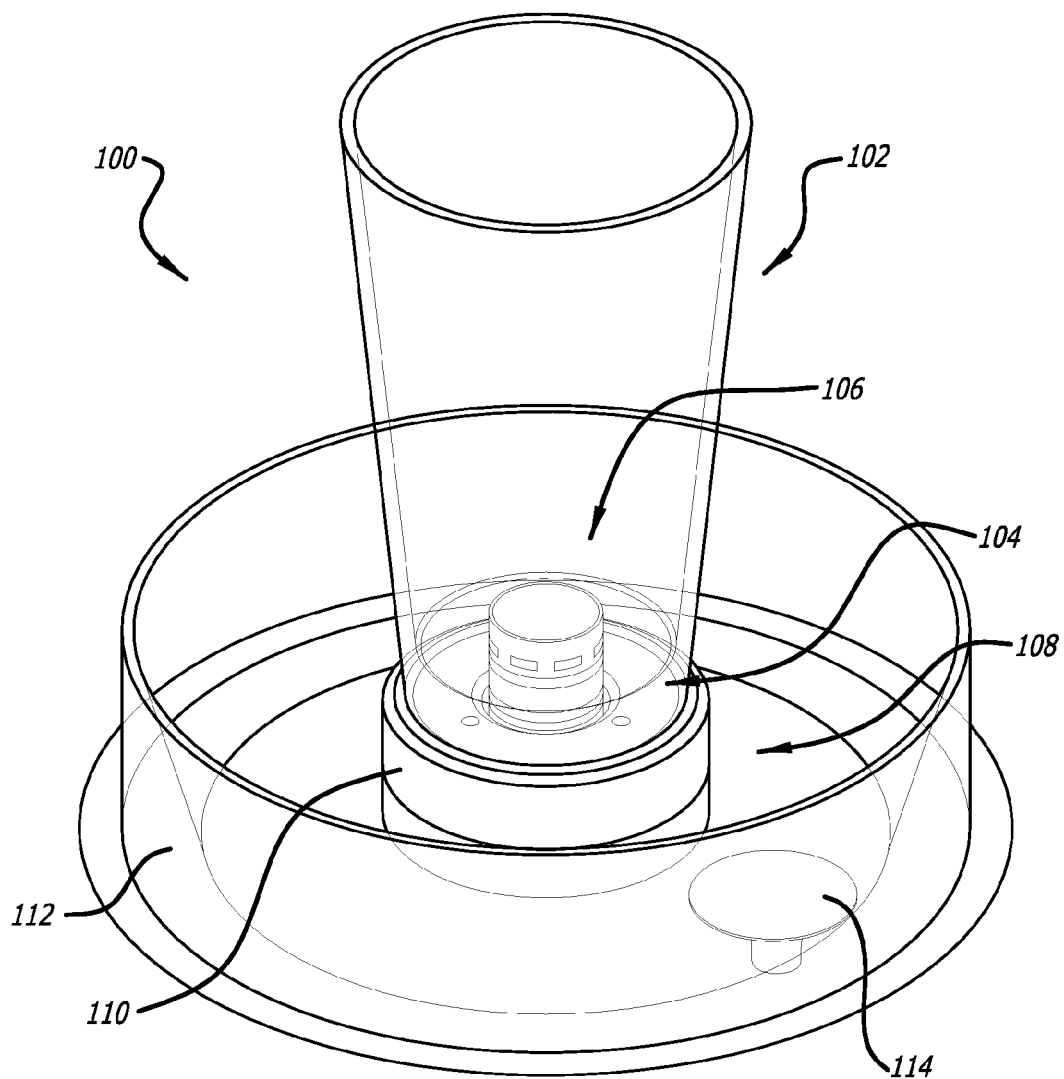
FIG. 1 illustrates a representative container connected to a beverage dispenser according to embodiments of the design for filling the container through its bottom.

In the following description of exemplary embodiments, reference is made to the accompanying drawings that form a part hereof, and in which it is shown by way of illustration specific embodiments in which the invention can be practiced. It is to be understood that other embodiments can be used and structural changes can be made without departing from the scope of the embodiments of this invention. As used herein, the terms "couple," "connect," and "attach" are interchangeable and include various forms of connecting one part to another either directly or indirectly. Also, it should be appreciated that one or more structural features described in one embodiment could be implemented in a different embodiment, even if not specifically mentioned as being a feature thereof.

In the following description, numerous specific details are set forth, such as examples of specific containers and liquids, in order to provide a thorough understanding of the present invention. It will be apparent, however, to one skilled in the art that the present invention may be practiced without these specific details. For example, the description is discussed generally in terms of devices used with a keg for dispensing beer into a glass or pitcher; however, the device may be used with other beverages, such as sodas, and other beverage containers, just as glasses or mugs, and storage containers other than kegs. Disposable cups are also envisioned as an alternative container, which may be used for beverages at parks, concerts, or other venues where glass is not permitted. Alternatively, the device is not so limited in the type of liquid stored and transferred. For instance, embodiments of the device may be used in transferring various fluids between two containers according to the below description, such as, for example, oil. Gaseous substances may also be transferred using embodiments of the assembly. The specific details may be varied and still be within the spirit and scope of the invention.

The fluid transfer assemblies and methods of fluid transfer described herein are believed to provide advantages in commercial applications, including the selling/serving of carbonated beverages such as beer more efficiently and effectively, providing a novel means for reaching target markets (e.g., use of a message such as a logo/slogan on a viewable and perhaps removable part of a mug or pitcher containing the novel coupling device described herein), etc. The fluid transfer assemblies and methods of fluid transfer described herein are also believed to provide advantages as a consumer product which can be utilized in a local setting, including the filling of containers with carbonated beverages and the customization of portions of the assembly. For example, it is contemplated herein that a family or group could host a party or special event using the fluid transfer assemblies and methods of fluid transfer described herein, customizing a viewable portion of the container to include a message, including a picture and/or text depicting the theme of the party (e.g., "50th birthday," "Family Annual BBQ," etc.). Further examples include sports team representations, wedding day graphics, amusing pictures, jokes, etc. Such viewable portions of the container or assembly could be removable as discussed below (e.g., a magnetic cap) to provide each person attending the party or special event a souvenir to take home.

In one embodiment, a method for filling a container through its bottom is provided. Filling a container through the bottom via use of the devices and methods described herein is advantageous, for example, in controlling the amount of foam created and significantly reducing the "head" on a carbonated beverage, such as soda or beer, relative to conventional methods. Moreover, by filling through the bottom of a container, the foam is pushed up and over the rim of the container, thereby reducing the amount of wasted beverage. A server may also benefit by not having to hold and tilt a glass or pitcher while pouring to remove the foam. Further, the number of taps may be reduced as more than one type of beverage may be poured from the same system. Alternative embodiments include a dispensing system assembly and device for filling a container through the bottom. Other embodiments of the system include liquid evacuation for cleaning between uses, as well as rapid drain attachments to remove a beverage after filling the container.

In one embodiment, a dispensing system is used to dispense a variety of fluids, including beverages such as, for example, beer, soft drinks, carbonated beverages, etc. The fluid may be dispensed via a nozzle associated with the dispensing system. The nozzle may be coupled to a fluid container at a bottom of the fluid container. The dispensing system may include a user interface, including options to enable a user to specify dispensing mode, dispensing volume, etc. The user interface may be associated with a processor. The dispensing system may dispense the fluid in automatic, semi-automatic, or manual mode. A sensor may be used to detect when a fluid container is properly placed on the dispensing platform. The sensor may also be used as a safety device to prevent fluid flow in any mode unless the fluid container is properly positioned onto to the dispensing platform. The sensor may further be used to indicate to the dispensing system when a fluid container has been removed so that the dispensing system may reset for the next filling, or perform a flush for cleaning.

FIG. 1 illustrates a representative container connected to a beverage dispenser according to embodiments of the design for filling a container through its bottom. Referring to FIG. 1, a dispenser 100 is illustrated including a container 102 coupled and ready to be filled. The dispenser 100 may be used to dispense beverages, including carbonated beverages such as soda, beer, etc. The container 102 may be any container for receiving the liquid, including for example a pint glass, mug, disposable glass, or pitcher. The container 102 may couple to the dispenser 100 at or near the bottom 104 of the container 102. Therefore, the container 102 is filled below a surface of the filling beverage during the dispensing process.

In one embodiment, the container 102 includes a container connection device 106 that is designed to couple to a dispenser connection device 108. The dispenser 100 may be coupled to a fluid source, such as a keg or carbonation and soda lines. The container connection device 106 may include a valve that opens when coupled to the dispenser connection device 108 and permits fluid flow therethrough. The container connection device 106 may then close when the container 102 is removed from the dispenser 100, thereby preventing leaks from the container 102. The dispenser 100 includes a housing 110 shaped to properly align the container connection device 106 with the dispenser connection device 108. The dispenser 100 may also include a basin 112 to catch any potential spilled liquid. The basin 112 may include various shapes, such as a bowl, raised lip, or recessed area. The basin 112 may include a drain 114 for easy disposal of caught liquid.

According to one aspect of the invention, during use, the container 102 is coupled to the dispenser 100. When the attachment is made, the container connection device 106 and the dispenser connection device 108 engage to create a fluid path between the container and a fluid source, such that the container 102 is filled from a bottom portion thereof. A user may overflow the container to remove any extra foam that may be created at the top of the container during the filling process. Alternatively, some fluid may spill during the removal or filling process. The basin 112 is designed to catch the overflow liquid, which may be removed through drain 114 to facilitate cleaning. When the container 102 is removed from the dispenser 100, the container connection device 106 may be disengaged from the dispenser connection device 108 to seal the container 102 from leaking.

In one embodiment, the dispenser 100 may be a separate device removed from the liquid source, but coupled by a hose or tube or other liquid transporting device. The dispenser 100 may be incorporated into, or coupled to, an immobile surface, such as a countertop, or may be an independently movable platform to be arranged at the convenience of the user. The dispenser 100 may also be in various shapes, and include additional features, such as the housing 110, basin 112, or drain 114. The dispenser 100 may alternatively include audio or visual devices. For example, the dispenser 100 may include information, logos, or designs identifying the contents associated with a specific dispenser. In one embodiment, the dispenser 100 may include lights that may be colored, or flash, or speakers that turn on when a container 102 is connected to the dispenser.

Figure 2A:
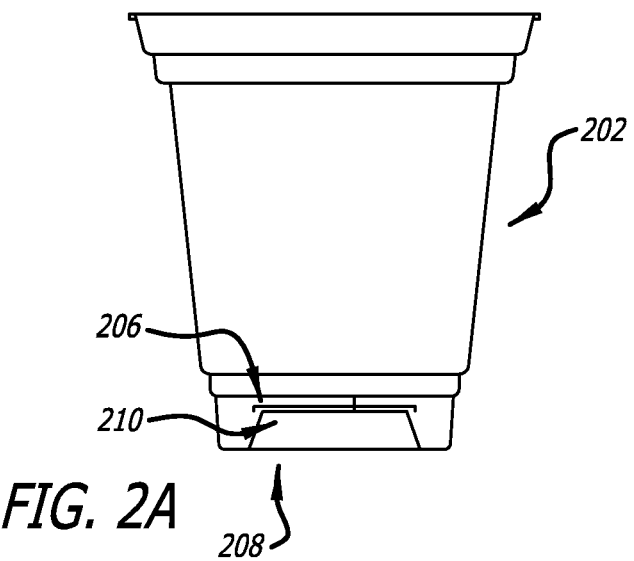
FIGS. 2A-C illustrate a representative progression of a container from a closed, liquid-holding state to an open, liquid-filling state, when the container is coupled to a beverage dispenser.
Figure 2B:
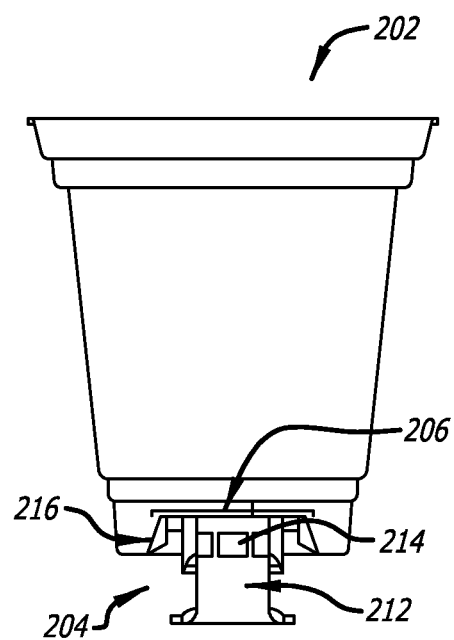
Figure 2C:
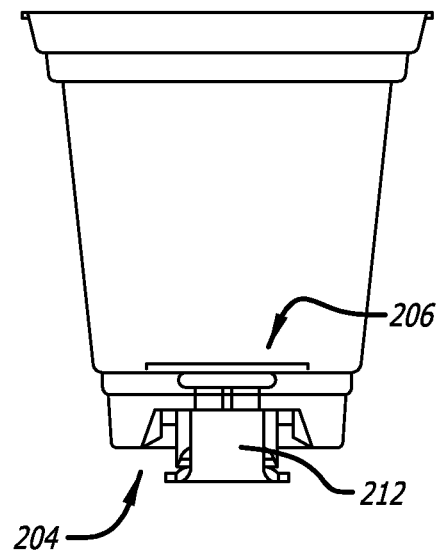

FIGS. 2A-2C illustrate a representative progression of an exemplary embodiment of a container 202 from a closed, liquid-holding state to an open, liquid-filling state, when the container 202 is coupled to a dispenser connection device 204. In one embodiment, the container connection device includes a valve, such as, for example, a cap 206, which is normally closed. The cap 206 is coupled to the bottom of the container 202 and may include a liquid-tight seal to prevent fluid flow out the bottom of the container.

In one embodiment, the cap 206 may be used as an advertising space, visible to a consumer while they are consuming their beverage. For example, in such an embodiment the cap 206 may include logos, images, etc. to promote a commercial enterprise or relay other information to the consumer. In one embodiment, the cap 206 itself, or a removable portion thereof, includes a magnetic material and commercial information, thereby serving to promote a company or product. For example, the magnet could have a company name and/or logo and could be taken home by a consumer as a souvenir for use on a refrigerator or other metal structure such that the company name and/or logo would be prominently displayed.

While coupled to the container 202, the dispenser connection device 204 may include a device for opening the cap 206 and permitting fluid flow between the dispenser connection device 204 and the container 202. The dispenser connection device 204 may couple to a liquid storage container, such as a keg, barrel, or other container. The dispenser connection device 204 may include a conduit to transfer the liquid from the storage container (not shown) to a serving or other container 202. The conduit may be generally flexible for guiding contents from the storage location to the dispensing location without kinking or impeding the fluid flow path.

FIG. 2A illustrates the container 202 in a closed configuration, capable of holding a fluid. The container 202 may be any beverage holding vessel, including a cup, pitcher, pint, mug, or the like, or any non-solid holding vessel. The container 202 includes a bottom 208 that may be used to support the container 202, and side walls to hold a fluid. The container 202 also includes a top opening for dispensing the contained fluid, such as for pouring or drinking. The bottom 208 has a bottom opening separate from the top opening, to permit fluid flow during filling. The bottom opening may be covered by a valve that creates a fluid tight seal when the container is not being filled. In one embodiment, the valve includes a cap 206 that is normally biased close to create a fluid tight seal. The cap 206 may include a magnetic material that is attracted to a complementary magnetic material of a ring 210 on bottom 208 of container 202. Ring 210 may generally encircle an outer edge of the hole, while the cap 206 has a shape and diameter that covers the hole and may overlap at least a portion of the ring.

FIG. 2B illustrates the container 202 in contact with a dispenser connection device 204, but before the valve of the container is opened. The dispenser connection device 204 is aligned with the bottom opening of the container 202. The cap 206 of the container 202 is biased closed by, for example, a magnetic attraction to the ring 210. The dispenser connection device 204 includes a nozzle 212 with holes 214 to permit fluid flow during filling. The nozzle 212 is dimensioned to fit inside the bottom opening of the container 202. The nozzle 212 pushes against the cap 206 and opens the valve of the container 202 to permit fluid flow for filling.

FIG. 2C illustrates the container 202 coupled to the dispenser connection device 204 when the valve of the container is open for filling. Nozzle 212 pushes against cap 206 as the nozzle enters the container 202 and exposes apertures 214. In one embodiment, once the container 202 and the dispenser connection device 204 are coupled, fluid is permitted to flow by opening a valve on the dispenser connection device 204. In an alternate embodiment, fluid automatically flows when the apertures are exposed. For example, the liquid in the dispenser connection device 204 may be kept under pressure. When not in use, the apertures 214 may be covered by a platform 216. When the container 202 is coupled to the beverage dispenser, the nozzle 212 may push against the cap 206 opening the valve of the container, while the bottom 208 of the container pushes against the platform 216, exposing the apertures 214. Once the apertures 214 are exposed, liquid may flow from the dispenser connection device 204 into the container 202 through the apertures 214.

When the nozzle 212 is removed from the bottom of the container 202, the valve of the container closes and seals the container such that liquid is held therein. When the valve is sealed, the container 202 may be used to hold the newly added liquid. In one embodiment, the cap 206 is continually attracted to the ring 210. When the influence of the nozzle 212 is removed, the cap 206 rests in a closed position against the ring 210, sealing the container 202. The fluid from the dispenser connection device 204 may be contained by closing a valve on the beverage dispenser. In one embodiment, as the cap 206 seals the container 202, the platform 216 seals the apertures 214. Therefore, fluid is prevented from freely flowing out of the dispenser connection device 204 when a container 202 is not attached.

Figure 3:
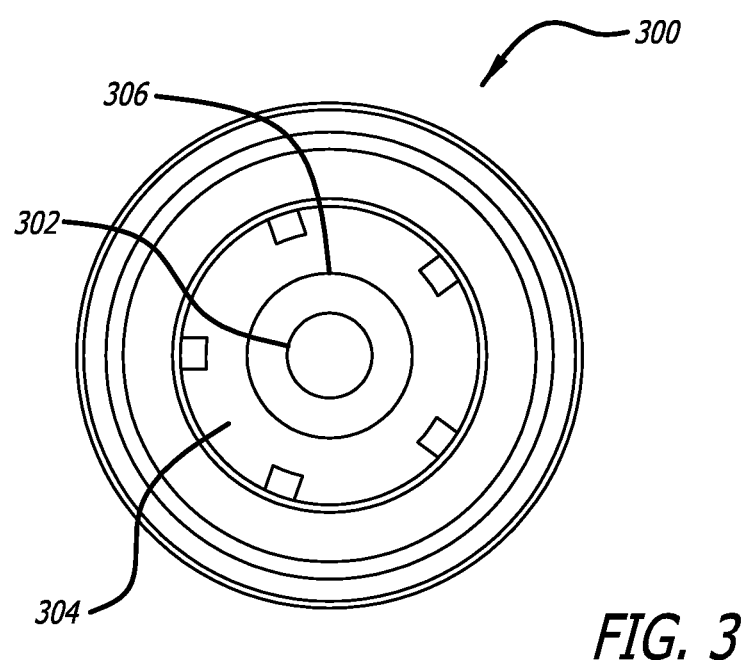
FIG. 3 illustrates a representative embodiment of a container bottom from a top view according to embodiments of the container connection device.

FIGS. 3-5 illustrate representative embodiments of a container connection device coupled at the bottom of a container. As described above, the container connection device may be designed to couple to a dispenser connection device. The container connection device may include a valve that opens when coupled to a dispenser connection device that permits fluid flow therethrough. The container connection device may then close when the container is removed from the dispenser, preventing any leaks from the container.

FIG. 3 illustrates a representative embodiment of a container bottom 300 from a top view, including a hole 302, cap 304, and ring 306. Hole 302 may permit fluid flow during filling from the bottom of the container. Ring 306 may surround a circumferential edge of the hole 302. Cap 304 may cover hole 302 and at least a portion of ring 306, and may overhang ring 306. Cap 304 and ring 306 may include magnetic material, such as a ferrous metal. The magnetic properties attract cap 304 to ring 306, sealing hole 302. Cap 304 may be coupled to the container bottom 300 so that it may be easily removed, such as by the magnetic attraction to the ring 306. Ring 306 may be more permanently coupled to container bottom 300, such as by adhesive, screwing, or integrally molded into the container bottom. The cap 304 and/or ring 306 may include a sealing device, such as an o-ring or gasket, to better ensure a fluid tight seal around hole 302. Alternatively, the container bottom 300 may include a sealing material, such as rubber, between the cap 304 and ring 306 to create a fluid tight seal.

The cap 304 may be of various shapes. For example, in one embodiment, the cap may be a flat, generally circular disk that fits inside the container bottom 300. Alternatively, the cap 304 may include a contoured surface to mate with the hole 302 to properly align the cap 304 to the hole 302 or to create a better seal for the hole. In one embodiment, the cap 304 may be contoured to mate with the dispenser connection device. For example, the cap 304 may include a recessed contour on an underside to receive a portion of the dispenser connection device and hold the cap 304 in a desired location during the filling process.

Figure 4A:
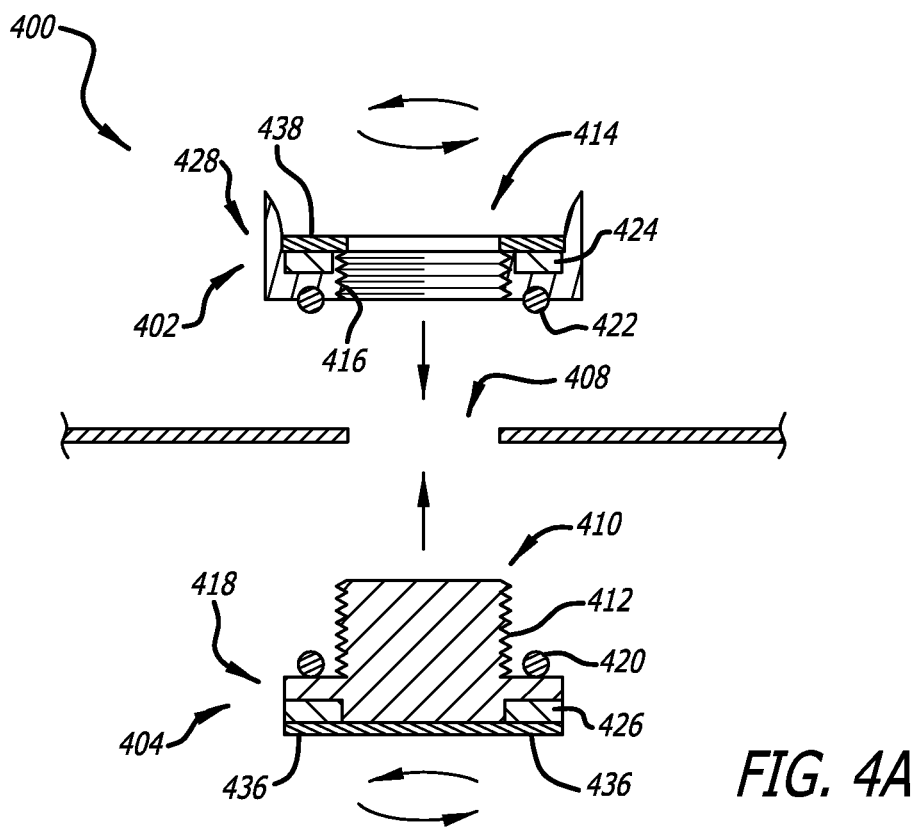
FIGS. 4A-B illustrate a representative embodiment of a container connection device in multiple pieces capable of connecting to a bottom of a container.
Figure 4B:
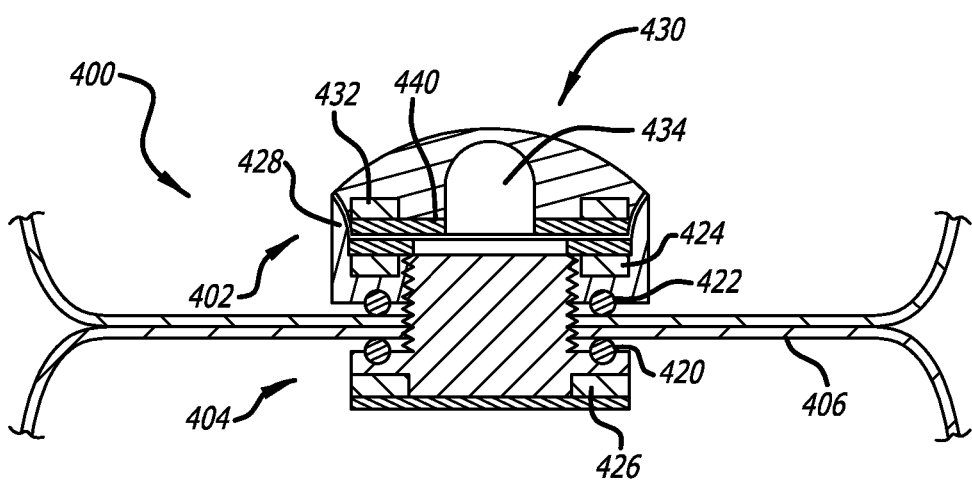

FIGS. 4A-B illustrate a representative embodiment of a container connection device 400 including an upper section and a lower section capable of connecting together at a bottom of a container. FIG. 4A illustrates a cut-away view of the representative embodiment of the upper section and lower section in an unassembled state, while FIG. 4B illustrates a cut-away view of the representative embodiment in an assemble state with the upper section and lower section attached together and to the container around the bottom opening. The attachable sections of the container connection device 400 permit removal of the container connection device for cleaning or use with other containers. The upper and lower sections 402, 404 may be threaded to engage one another through an opening 408 in the bottom of the container 406. The sections may alternatively be joined by other means, such as gluing or bonding. The container connection device may alternatively be integrated directly into the container bottom.

In one embodiment, an upper section 402 may couple to a lower section to create the container connection device 400. A lower section 404 may include a generally cylindrical shaft 410 that has a diameter smaller than opening 408 in the bottom of a container 406. The diameter of the opening 408 and the shaft 410 may be generally the same size to create a snug fit to assist in leak reduction and proper alignment between the container connection device 400 and the container 406. The shaft 410 may alternatively be relatively smaller than opening 408 in the container 406 to permit alternatively sized container connection devices to be coupled to the container bottom. The inner diameter of the shaft 410 may be sized and shaped to accommodate the dispenser connection device as explained further below. The outside of the shaft 410 may include threads 412 to engage the upper section 402. The upper section 402 may be generally cylindrical in shape with an inner opening 414 including threads 416 to engage the threads 412 of the lower section 404.

The lower section 404 may also include a flange 418 at the base of shaft 410. The flange 418 may have an outer diameter greater than the opening 408 to provide a surface to engage the container 406 bottom. The flange 418 may include a seal member 420, such as an o-ring or gasket. The seal 420 may press against the bottom side of the container 406 when the upper section 402 engages the lower section 404 to create a fluid tight seal. The upper section 402 may also contain a seal member 422 on a bottom side to press against a top surface of the container 406. Therefore, a portion of the container 406 may be sandwiched between seal members on the upper section 402 and the lower section 404 of the container connection device.

The container connection device 400 includes a cap 430 including a magnetic material and shape configured to mate with the upper section 402. In one embodiment, the upper section 402 includes a rim 428 with an inner surface that mates with an outer surface of the cap 430. Of course, in alternate embodiments the rim could have an outer surface to mate with an inner surface of the cap. The rim 428 may be a generally cylindrical rim with an inclined inner edge to direct the cap 430 to a central position over the inner opening 414 of the upper section 402. The inclined edge permits a space to form between the upper section 402 and the cap 430, when the dispenser connection device presses the cap away from the upper section. In one embodiment, the upper section 402 includes a magnet 424 to attract magnet 432 in the cap 430 to bias the cap in a closed position. The two magnets 424 and 432 may be rings or discrete magnetic pieces coupled to the respective sections. The magnets may be adhered, bonded, integrally formed, molded, or otherwise attached to the respective sections to attract the cap to the upper section. Alternatively, the material used for the upper section and/or the cap may be magnetic. In one embodiment, the cap 430 may include a recess 434 to mate with the dispenser connection device (not shown). The recess 434 may receive a portion of the dispenser connection device that opens the valve by pushing upward on the cap 430 and providing a space between the cap 430 and upper section 402. When the dispenser connection device is removed, the magnetic attraction between the cap and upper section closes the valve, and the rim of the upper section ensures proper alignment. The upper section and/or the cap may include a seal, such as an o-ring or gasket, to further prevent leaks when the valve is closed.

In one embodiment, the container connection device 400 may include one or more magnets. As described above, the upper section 402 may include a magnet to attract a cap 430 to act as a valve for the container connection device 400. In one embodiment, the lower section 404 may include a magnet 426 to couple the container connection device 400 to the dispenser connection device (not shown). The magnet 426 may be glued, adhered, bonded, integrally molded, or otherwise attached to the lower section 404, for example in the flange 418. The magnet 426 may attract another magnet or magnetic material included in a base or section of the dispenser connection device to stabilize the container during filling. The container connection device 400 may also include one or more seals to provide a fluid tight connection between the container connection device and the dispenser connection device. For example, lower section 404 may include a seal 436 to couple to a dispenser connection device. Upper section 402 may include seal 438 and/or cap 430 may include seal 440 to provide a fluid tight connection between the cap 430 and the upper section 402 when the container connection device 400 is in a closed position. Seals may be any sealing device known to those with skill in the art, such as o-rings or gaskets.

Figure 5A:
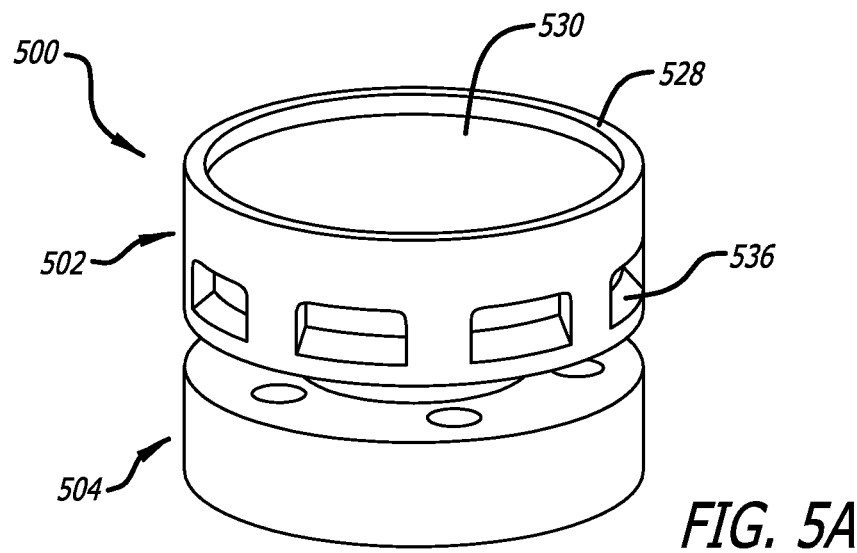
FIGS. 5A-B illustrate a representative embodiment of a container connection device capable of connecting to a bottom of a container.
Figure 5B:
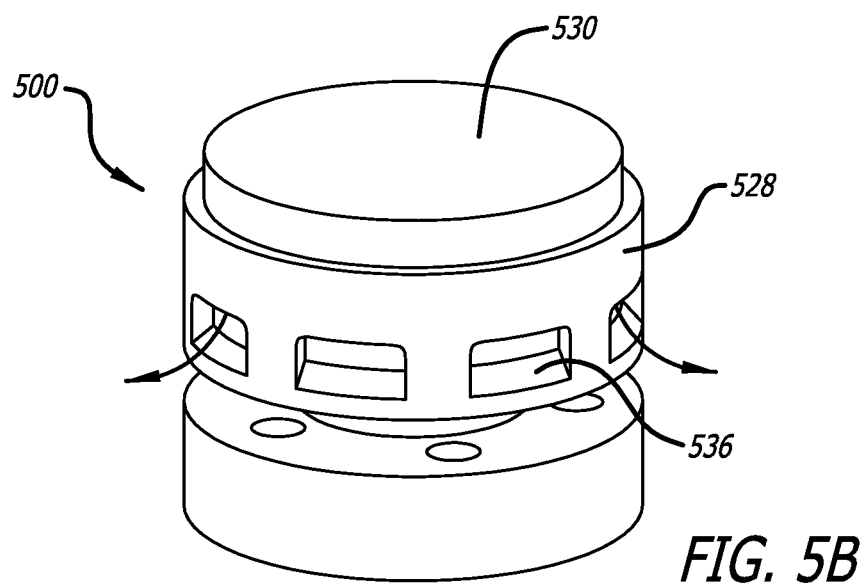

FIGS. 5A-B illustrate a representative embodiment of a container connection device capable of connecting to a bottom of a container according to aspects of the design. FIG. 5A is the container connection device in a closed, fluid tight position, while FIG. 5B is the same container connection device illustrated in an open position. When the valve is closed, a liquid tight seal is created to prevent leakage while the container is filled. When the valve is open, liquid may be transferred to the container from another source. The upper section 502 may be joined with the lower section 504 to permit the container connection device 500 to easily couple/decouple from a container. The upper section 502 may be modified so that the cap 530 is not freely disassociated from the upper section 502, as shown in FIG. 4B and described above.

In one embodiment, the upper section 502 may include a generally cylindrical rim 528 that circumferentially surrounds a cap 530. The cap 530 is permitted to translate up and down a longitudinal axis of the rim, but is prevented from being fully decoupled from the upper section 502. For example, the cap 530 may be a generally cylindrical button with a flange circumferentially around a central portion. The flange may rest within an indention within an inner surface of the upper section 502. The height of the indention is larger than the height of the flange so that the cap may translate within a distance defined between where the flange contacts the two subscribing surfaces of the indention. In one embodiment, the upper section 502 further includes apertures 536 that create a fluid flow path when the cap 530 is in an open position. For example, when the cap 530 is in an up or open position, a path is created between the shaft of the lower section 504 and the apertures 536 of the upper section 502. When the cap 530 is in a down or closed position, the path is sealed. The cap 530, upper section 502, and/or lower section 504 may include seals to prevent fluid leaks when the cap is in a closed position. The cap 530, upper section 502, and/or lower section 504 may include magnets to bias the cap 530 in a closed position.

FIGS. 6-9B illustrate representative embodiments of a dispenser connection device. As described above, the dispenser connection device may be designed to couple to a container connection device. The dispenser connection device may connect to a fluid source, such as a keg or soda fountain syrup and carbonation containers. The dispenser connection device may include additional features, as discussed in FIG. 1, above, such as for example, a base, basin, drain, advertisement area, lights, sounds, etc. Different embodiments of the container connection device and the dispenser connection device may be modified to include features of the different embodiments. Representative embodiments of the dispenser connection device are described below in terms of corresponding to representative container connection devices, but these devices may be mixed or altered as apparent to one skilled in the art.

Figure 6:
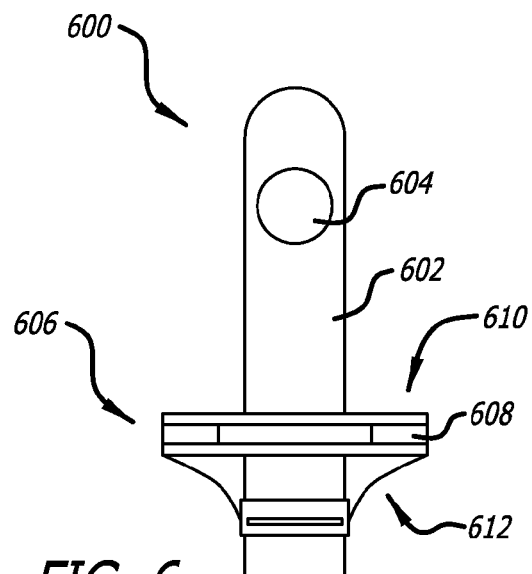
FIG. 6 illustrates a representative dispenser connection device according to embodiments of the invention that may be coupled to a container connection device, such as the container connection device illustrated in FIG. 4.

FIG. 6 illustrates a representative dispenser connection device 600 according to embodiments of the invention that may be coupled to a container connection device, such as the one illustrated in FIGS. 4A-B. The dispenser connection device 600 includes a rigid member or nozzle 602 including a passage along a longitudinal axis and one or more apertures 604 through a sidewall of the rigid member or nozzle 602. The passage of the rigid member or nozzle is in fluid communication with a fluid source. The nozzle 602 is designed to open a container connection device 400 by pushing against a valve member thereof such as cap 430. The top of the nozzle 602 may be contoured or shaped to mate with a recess 434 of the cap 430 so the cap is held by the nozzle. The dispenser connection device 600 may include a magnet or magnetic material to secure the container connection device 400. For example, the dispenser connection device 600 may include a platform 606 including a magnetic ring 608 that couples to the magnet 426 of the lower section 404 of container connection device 400. The dispenser connection device 600 may also include a seal 610 to create a fluid tight connection between the dispenser connection device 600 and the container connection device 400. Collar 612 may be coupled between platform 606 and nozzle 602 to allow the platform to translate along a longitudinal axis of the nozzle 602.

Figure 7A:
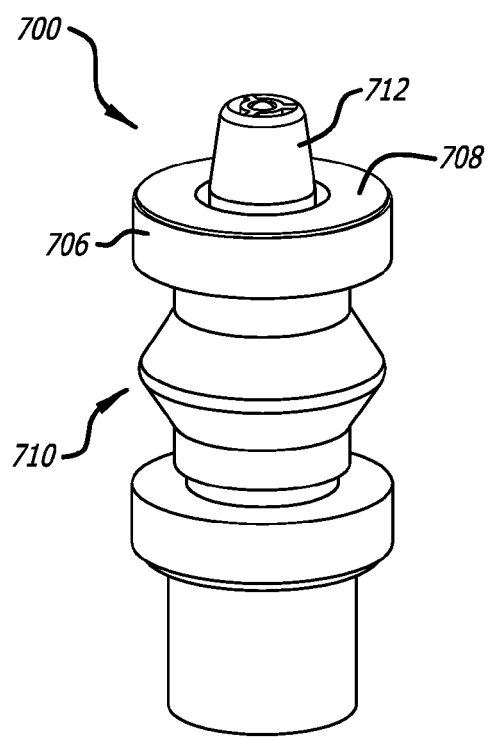
FIGS. 7A-B illustrate a representative dispenser connection device according to embodiments of the invention that may be coupled to a container connection device, such as the container connection device illustrated in FIG. 4.
Figure 7B:
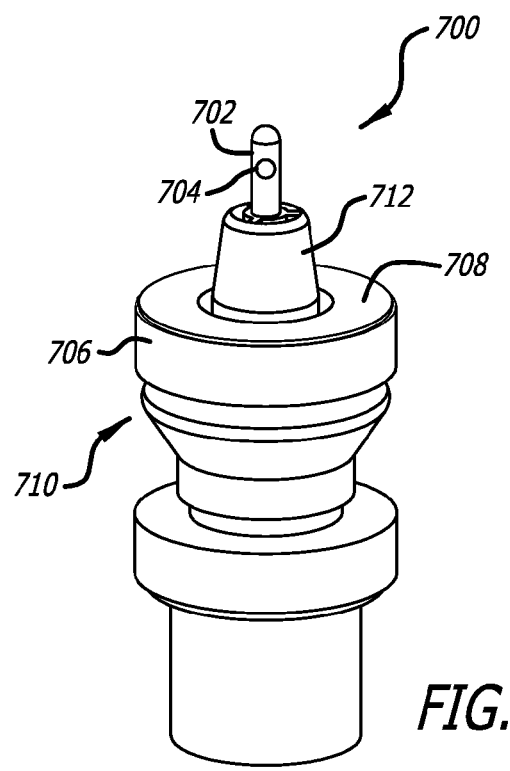

FIGS. 7A-B illustrates a representative dispenser connection device 700 according to embodiments of the invention that may be coupled to a container connection device, such as the one illustrated in FIGS. 4A-B. FIG. 7A illustrates the dispenser connection device 700 in a closed position, while FIG. 7B illustrates the dispenser connection device 700 in an open position. Similar to FIG. 6, the dispenser connection device 700 may include a nozzle 702 with an aperture 704 to create a fluid path between the fluid source and dispenser device to the container. The dispenser connection device may also include a platform 706 including a seal 708 to prevent fluid leaks between the dispenser connection device 700 and the container connection device.

In one embodiment, the dispenser connection device may include a collar 710. Collar 710 may be used to retain platform 706 to the dispenser connection device 700. Additionally, collar 710 may be used to cover nozzle 702 when the dispenser is not in use, thereby potentially reducing leaks or reducing contamination or debris from entering the dispenser. The platform 706 may also include a rim 712 that may be used to seal nozzle 702 when the dispenser is not in use. Rim 712 may include an angled exterior circumferential wall so that a top edge is at a reduced diameter than the lower edge. The reduced top diameter may assist in properly aligning the dispenser connection device with the container connection device.

Figure 8:
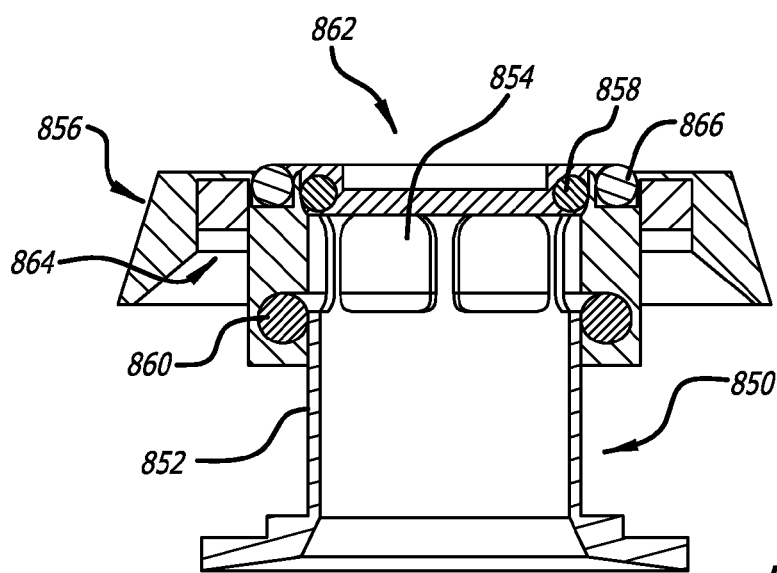
FIG. 8 illustrates a representative dispenser connection device according to embodiments of the invention that may be coupled to a container connection device, such as the container connection device illustrated in FIG. 3.

FIG. 8 illustrates a representative dispenser connection device 850 according to embodiments of the invention that may be coupled to a container connection device, such as the one illustrated in FIG. 3. The dispenser connection device 850 may mate with container bottom 300 to seal the connection between the fluid dispenser and container during filling. The dispenser connection device 850 may be coupled to a countertop or other serving platform (not shown). The dispenser connection device 850 may be coupled to a liquid storage container, a conduit to the liquid storage container, or the like.

In one embodiment, the dispenser connection device 850 may include a nozzle 852. Nozzle 852 may be a generally cylindrical shaped spout dimensioned to fit within hole 302. Nozzle 852 may be used to push against cap 304 to break its seal with ring 306. Nozzle 852 may include one or more apertures 854 that permits liquid to flow through and dispense into a container (not shown). The beverage dispenser may include a switch to permit fluid flow once a container is coupled to the dispenser connection device. Nozzle 852 may include a disc 862 along its top edge. Disc 862 may be used to provide advertising space, or may be used to identify the beverage coupled to the beverage dispenser. For example, the disc 862 may replace the existing beer tap used at many facilities today to indicate the types of beverages and may have other nostalgic possibilities, such as give away prizes when a brand is retired.

In one embodiment, dispenser connection device 850 may include platform 856 to assist in properly aligning the container with the dispenser. Platform 856 may be shaped to center and couple the container to nozzle 852. As an example, an outer edge of platform 856 may be generally cylindrical in shape to conform to an inner surface of a bottom rim on a container. The outer edge of platform 856 may be slightly tapered to guide the bottom rim of a container into place and properly align the container with nozzle 852. Alternatively, platform may include an upper rim (not shown) that an outer edge of a container may fit into. The upper rim may be stepped to properly align various sized containers with nozzle 852.

In one embodiment, to prevent leaks from the fluid dispenser when it is not coupled to a container, apertures 854 may be closed by platform 856. Platform 856 may be used to seal the apertures 854 when not in use. In one embodiment, platform 856 circumferentially surrounds apertures 854, when in a closed position. The platform 856 may slide axially on nozzle 852 permitting the platform 856 to expose apertures 854 during filling. During use, the container bottom 300 may push on platform 856, while permitting nozzle 852 to enter through hole 302, and therefore exposing apertures 854. Platform 856 may return to a closed position after filling. Platform 856 may move under a biasing force, such as a spring. Alternatively, platform 856 may return to a closed position under the influence of magnetic attraction between the platform and container, as the container is raised to remove it from the nozzle. The platform 856 and or nozzle 852 may include a friction connection, including a detent and flange, to secure the platform in a closed position with respect to the nozzle. This connection may be overcome, and thereby open the flow path of the nozzle, by the downward force of the container on the platform. In one embodiment, the described sealing platform may be used as the valve to initiate flow between the beverage dispenser and the container, thereby permitting fluid flow as soon as the apertures 854 of nozzle 852 are exposed.

The dispenser connection device may include a magnet or magnetic material to attract a corresponding magnet or magnetic material within the container connection device. For example, platform 856 may include a ring 864 that includes a magnetic material that may be used to secure the container to the platform 856 during filling. The ring 864 of the platform 856 may be used to attract ring 306 on the bottom of container 300. In one embodiment, disc 862 may include a magnetic material to hold cap 304 of container connection device when the container is placed on the nozzle 852, and in an open position.

Platform 856 and/or nozzle 852 may include one or more seals for a fluid tight connection between nozzle and platform and container. For example, nozzle may include a seal 858 to seal an upper edge of apertures 854, while platform 856 may include seal 860 to seal the lower edge of apertures 854, while in a closed position. Platform 856 may include a seal 866 on an upper surface to create a seal between container and platform, when in an open position. Seals may include a rubber o-ring or other gasket material for maintaining a fluid tight seal.

Platform 856 and/or nozzle 852 may be shaped to prevent platform 856 from sliding off the end of nozzle 852. For example, an upper edge of platform 856 may have a larger inside diameter that rests against a top of nozzle 852, such as for example at seal 858. The top of nozzle 852 may have a greater outside diameter to match the larger inside diameter of platform 856. The greater outside diameter of nozzle 852 may prevent the platform 856 from sliding off the upper edge of nozzle. The seal 858 may be used as the greater outside diameter of nozzle 852 to retain the platform 856 to the nozzle 852, while creating a seal when nozzle and platform are in a closed position. This embodiment permits easy installation, as the platform 856 may slide over the top of nozzle 852 for installation, before seal 858 is added.

Figure 9A:
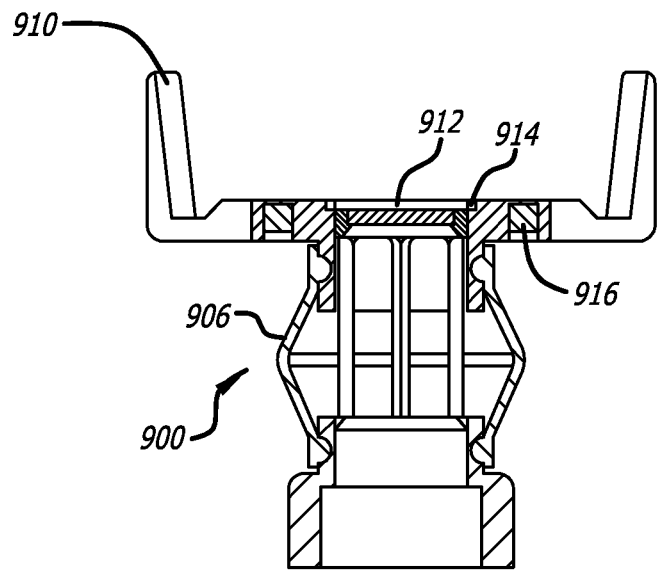
FIGS. 9A-B illustrate a representative dispenser connection device according to embodiments of the invention that may be coupled to a container connection device.
Figure 9B:
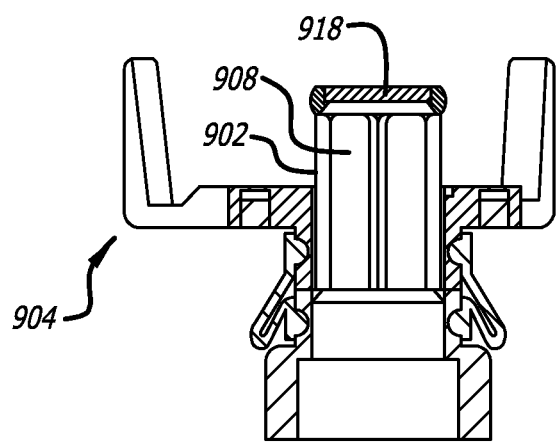

FIG. 9 illustrates a representative dispenser connection device 900 according to embodiments of the invention that may be coupled to a container connection device. FIG. 9A illustrates the dispenser connection device 900 in a closed position, and FIG. 9B illustrates the dispenser connection device 900 in an open position. Dispenser connection device 900 may include a nozzle 902 for filling a container through a bottom thereof. Nozzle 902 may include apertures 908 to create a fluid flow path between the beverage dispenser and the container. Dispenser connection device 900 includes a nozzle 902 and platform 904 surrounding the nozzle, the platform including an opening 912 through which the nozzle is permitted to translate. The platform is attached directly to a collar 906, which is shown in FIGS. 9A-B as a flexible member, which covers apertures 908 of the nozzle in a dispenser connection device closed position, and which uncovers apertures 908 in a dispenser connection device open position.

Collar 906, in addition to being made of a flexible material to permit translation of the platform 904 with respect to the nozzle 902, may be formed of a liquid-tight material, such as a rubber or plastic, in order to prevent leaks from the nozzle 902. In a dispenser connection device closed position, the platform 904 opening is positioned generally coincident with the end surface of the nozzle. In a dispenser connection device open position, the collar flexes outward to translate the platform 904 with respect to the nozzle 902, along a longitudinal axis of the nozzle 902, such that the nozzle 902 moves through the opening 912 of the platform 904.

Collar 906 may be used in place of or in addition to seals, as described in FIG. 6. Alternatively, collar 906 may cover at least a portion of apertures 908 and prevent fluid flow when not in use. Collar 906 may be coupled between dispenser connection device 900 and platform 904 by various means. In one embodiment, the dispenser connection device 900 and the platform 904 include indentions around a lip. In such an embodiment the collar 906 correspondingly includes a protrusion dimensioned to fit within the indention and over the corresponding lip of the dispenser connection device 900 and the platform 904. The lip and indention may be used to frictionally hold the collar 906 tight against the platform 904 and dispenser connection device 900, creating a fluid tight seal. Alternatively, or in addition, adhesives may be used to couple the collar 906 to the platform 904.

The platform 904 may include a rim 910 that properly positions the container relative to the nozzle 902. The rim 910 may be a fork style coupler, including one or more prongs, or may be a solid rim, which may include a stepped bottom to accommodate various sized containers, or combinations thereof. Other embodiments, as described herein or known to one skilled in the art, may alternatively be used to position or hold the container. A seal 914 may be included on an upper surface of the base of the platform 904 to create a seal with the container. Seal 914 may circumferentially surround opening 912.

Dispenser connection device 900 may include a magnet or magnet material to couple to a container connection device. For example, platform 904 may also include a ring 916 incorporating or formed from a magnetic or ferrous material to secure the container connection device to the platform during filling. In one embodiment, a top of the nozzle 902 includes disc 918 that may be used to hold cap of the container connection device (not shown) during filling. The disc 918 may include a magnet or magnetic material to attract the cap and/or may be contoured to mate with a corresponding contour of the cap. In one embodiment, the disc 918 may include information, such as, for example, the type or brand of the beverage served from the dispenser, advertising materials. etc.

Figure 10:
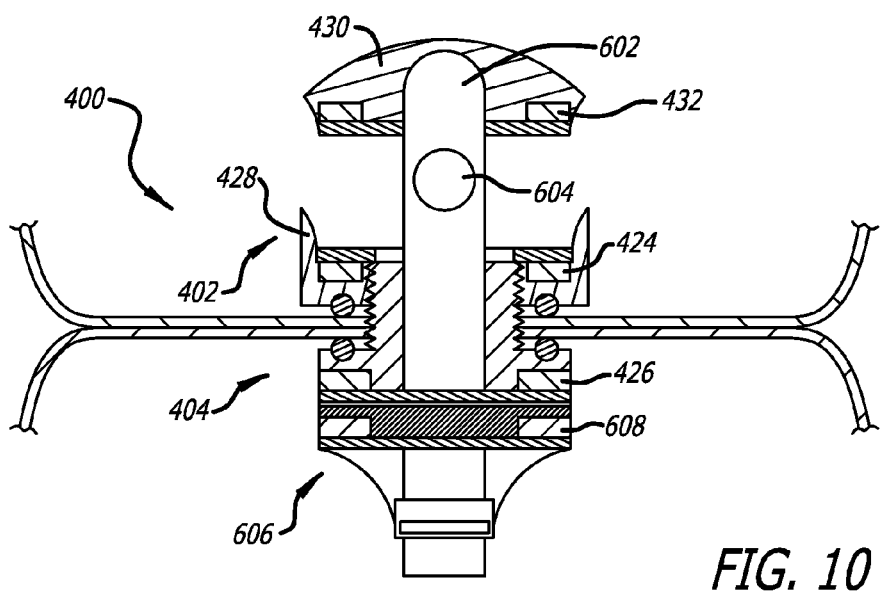
FIG. 10 illustrates the container connection device of FIG. 4 coupled to the dispenser connection device of FIG. 6 in an open position for fluid flow between a fluid source and the container.
Figure 11:
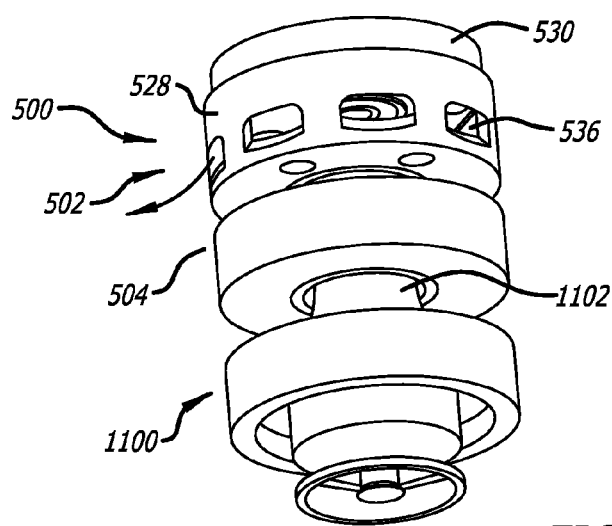
FIG. 11 illustrates the container connection device of FIG. 5 coupled to the dispenser connection device in an open position for fluid flow between a fluid source and the container.

FIGS. 10-11 illustrate representative embodiments of a container connection device coupled to a dispenser connection device. When the attachment is made, the container connection device and the dispenser connection device engage to create a fluid path between the container and a fluid source. The container may then be filled from a bottom portion thereof. When the container is removed from the dispenser, the container connection device is disengaged from the dispenser connection device and seals the container from leaking.

FIG. 10 illustrates the container connection device of FIGS. 4A-B coupled to the dispenser connection device of FIG. 6 in an open position for fluid flow between a fluid source and a container. When connected, the nozzle 602 pushes against cap 430 to overcome the magnetic attraction between the upper section magnet 424 and the cap magnet 432 to expose the aperture 604 to the interior of the container 406. The container 406 is also stabilized during this process by the magnet 608 in the platform 606 as it attracts the magnet 426 in the lower section 404 of the container connection device. As shown, the nozzle 602 head is shaped to compliment the recess 434 of the cap 430 to maintain the cap in proper alignment during the filling process.

FIG. 11 illustrates the container connection device 500 of FIGS. 5A-B coupled to dispenser connection device 1100 in an open position for fluid flow between a fluid source and the container. When connected, the nozzle 1102 pushes against cap 530 to overcome the closed bias between the upper section 502 and the cap 530, thereby uncovering the apertures 536 of the rim 528. In this embodiment, the cap may be biased closed by a magnetic attract, spring, or other biasing force suitable for the device.

Figure 12:
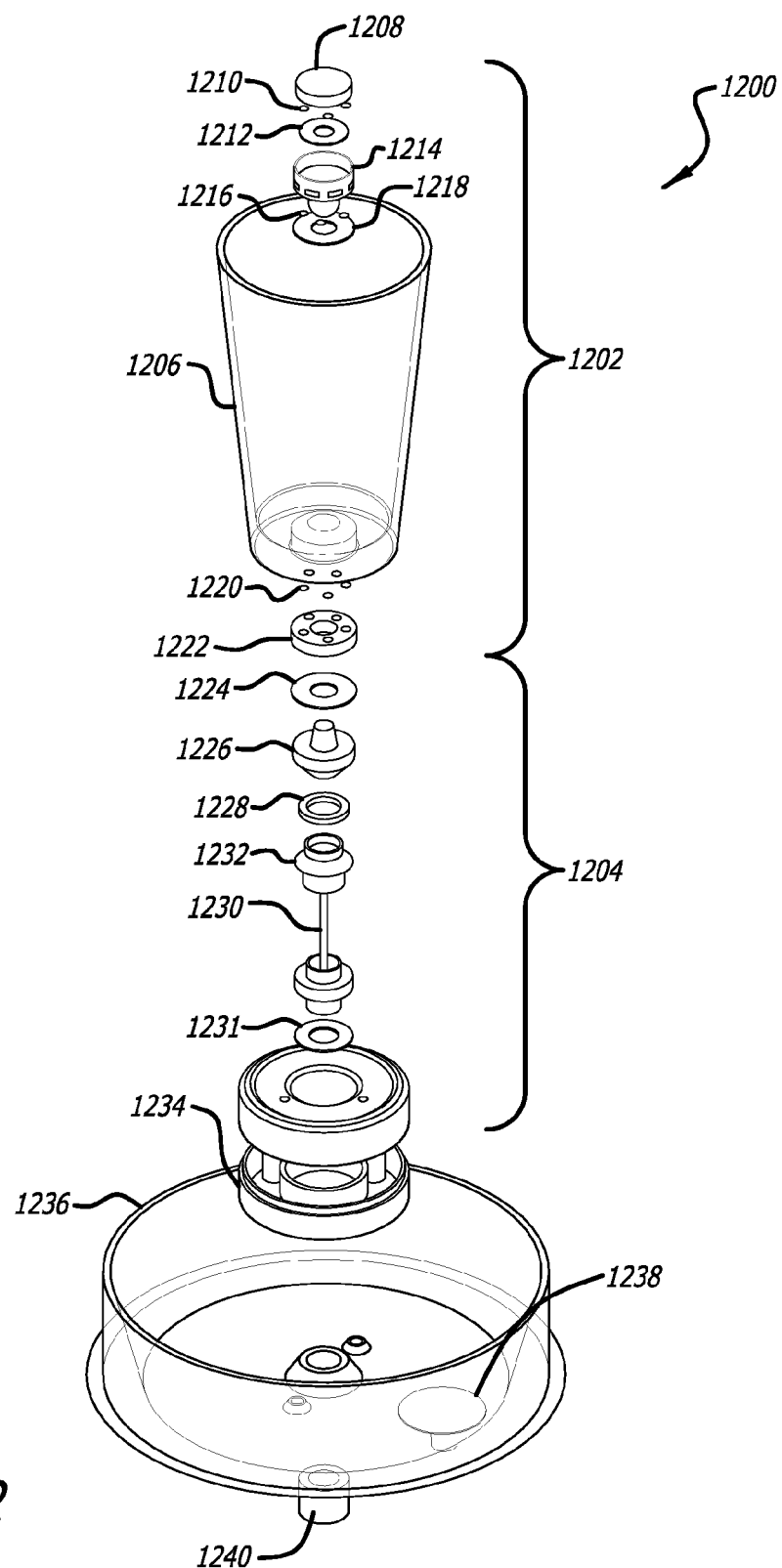
FIG. 12 illustrates an exploded view of a representative dispensing system according to embodiments of the invention, including a container with a container connection device and a dispenser with a dispenser connection device with various features described herein.

FIG. 12 is an exploded view of a representative dispensing system according to embodiments of the invention, including a container with a container connection device and a dispenser with a dispenser connection device, each including various features described herein. A person skilled in the art will be able to combine these and other features described herein into different embodiments, all of which are within the scope of the invention. The system 1200 includes a container with container connection device 1202, as well as a dispenser with dispenser connection device 1204.

In one embodiment, a container 1206 includes a container connection device 1202. The container connection device 1202 includes a cap 1208, cap housing magnets 1210, seal 1212, rim 1214, rim housing magnets 1216, seal 1218, bottom section 1222, and bottom housing magnets 1220. The magnets 1210, 1216, 1220 may be one or more magnetic pieces that fit within various indentions of the container connection device, solid magnetic rings, or material incorporated into the respective components of the container connection device. Seals 1212, 1218 may be any sealing device, such as an o-ring or rubber gasket.

In one embodiment, cap housing magnets 1210 comprise five neodymium magnets 1210 equally spaced around a circumference of the cap 1208 and held in place by seal 1212. Seal 1212 may be a rubber gasket generally disc-shaped to create a seal at the cap in a closed position. Rim 1214 includes apertures to permit fluid flow when the cap is in an open position, and includes rim housing magnets 1216, comprising five neodymium magnets corresponding to the five cap housing magnets, together operating to bias the cap 1208 in a closed position. Seal 1218 seals the rim 1214 to the container 1206. The bottom section 1222 couples to the rim 1214 and may include neodymium magnets 1220 to attract the dispenser 1204.

In the embodiment of FIG. 12, the dispenser includes a dispenser connection device 1204, including a first seal 1224 for a filler valve 1226, a filler valve magnet 1228, a nozzle 1230, a collar 1232 between the filler valve 1226 and nozzle 1230, and a second seal 1231. The first and second seals 1224 and 1231 may be an o-ring, gasket, or other device to create a liquid tight seal between the dispenser connection device 1204 and the container connection device 1202.

In one embodiment, nozzle 1230 may be a shaft that enters through the container connection device 1202 to push against cap 1208 and create a fluid pathway between the dispenser and the container. The nozzle may include one or more apertures to permit fluid flow therethrough. The filler valve 1226 may move along a longitudinal axis of the nozzle 1230 to open and close the fluid flow path through the nozzle. The filler valve 1226 may be contoured, including a rim to mate with the bottom section 1222 of the container connection device 1202. This connection permits the dispenser connection device 1204 and container connection device 1202 to move together during the coupling/decoupling to reduce leaks. Magnet 1228 may be a neodymium magnetic ring coupled to the filler valve 1226, which is designed to attract magnets 1220 of the bottom section 1222 of the container connection device 1202, and further ensures that the container connection device 1202 moves with the dispenser connection device 1204 during use. The magnetic attraction may further stabilize container 1206 during the filling process. The collar 1232 couples the filler valve 1226 to the nozzle 1230, permitting the filler valve 1226 to translate along the nozzle while remaining coupled to the nozzle during use. The collar 1232 may be formed from a flexible rubber material that is shaped to easily compress, but which expands back to its pre-compressed shape to provide a bias for the filler valve 1226 to close nozzle 1230. The collar 1232 may further provide protection against leaks during use.

In one embodiment, the dispenser may further include other features such as a basin, drain, lights, etc. For example, the dispenser may include a housing 1234 for switches, lights, or other features. The housing may be used as an advertising or identification space, such as to identify the type or brand of beverage coupled to the dispenser. Housing 1234 may include LED lights that illuminate the liquid during the filling process. Pressure switches may be incorporated in the housing to trigger the LED lights or may be used to activate the filling process when a container is detected on the housing. The LED lights may alternatively or also be housed around the basin or other parts of the dispenser connection device. The dispenser may also include a basin 1236 to catch any overflow during the filling process. The basin 1236 may be used to intentionally overflow a foaming beverage in order to remove excess foam from the top thereof. The basin 1236 may include a drain 1238 to permit easy clean up after use. The dispenser may include conduit 1240 to couple the dispenser to a fluid source. The conduit may be a manifold permitting attachment to multiple fluid sources, thereby permitting the dispenser to be used for multiple beverages. In such an embodiment, the desired beverage may be chosen by the user via a switch or rotation of a manifold selection member.

Figure 13:
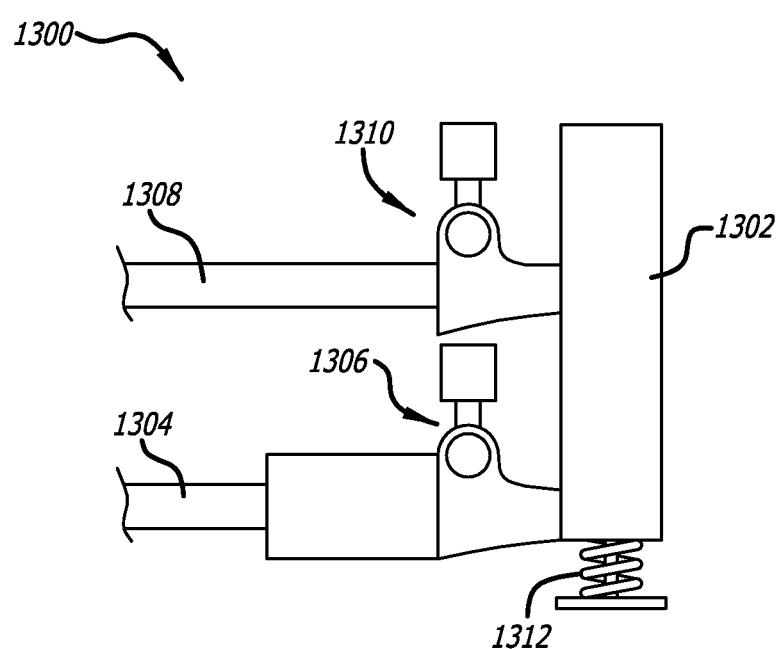
FIG. 13 illustrates a representative flushing device according to embodiments of the invention.

Any of the above described embodiments of the dispensing system and combinations thereof may further include a flushing device to remove liquid from the dispensing system between uses. FIGS. 13-14 illustrate representative flushing devices according to embodiments of the invention. A fluid conduit may be coupled to the dispenser directly or indirectly, such as through a manifold. A valve may be coupled between the fluid conduit and the nozzle. A water or flushing line may also be coupled to the dispenser through a separate valve. The flushing line may alternatively be coupled to the manifold as one of the liquid sources coupled to the dispenser. Once the liquid of choice, such as beer, is poured, the valve coupling the beer line and the container is closed. The valve coupling the dispenser and the flushing line is then opened to flush the dispenser and connections. A drain may be included to drain the flushing fluid (e.g., water) from the connections. A new container may then be connected and filled without being comingled with the previous liquid choice. Preferably, water may be used to flush the dispenser and coupling devices. However, other substances may be used, such as, cleaning agents, solutions, alcohol, or forced air, to remove the previous contents from the coupling devices.

FIG. 13 illustrates a representative flushing device 1300 according to embodiments of the invention. The dispenser may include a nozzle 1302 as previously described and may be connected to a liquid conduit 1304, such as a beer line. The dispenser may also include a valve 1306 between the liquid conduit 1304 and the nozzle 1302 to start and stop the flow of the desired liquid. A flow meter 1308 may also be coupled to the liquid conduit 1304. Once a container is connected to the dispenser, the valve 1306 may be opened, permitting the desired liquid to flow from the liquid conduit 1304 into the container, through the nozzle 1302. The valve 1306 may be closed to stop the flow of fluid, when the container is full. A flushing line 1308 may also be coupled to the dispenser which connects the nozzle 1302 to a flushing source, such as water. A flushing valve 1310 may be included between the flushing line 1308 and the nozzle to permit the flushing fluid to clean the nozzle 1302 after the filling process. The valve 1306 and flushing valve 1310 may be manually or automatically operated. In one embodiment, the valve 1306 and the flushing valve 1310 are electromagnetic valves that include a steel ball held out of the fluid flow path when the valve is opened by an electromagnet. The steel ball is then permitted to obstruct the flow path when the valve is closed.

A drain valve 1312 may be used in conjunction with the flushing valve to drain the flushing fluid from the dispenser. In one embodiment, activating the flushing valve 1310, which permits flushing fluid to flow through the dispenser, also activates a drain valve 1312. Therefore, the drain valve 1312 may provide an alternate path for the flushing fluid after rinsing the nozzle 1302, so that flushing fluid does not exit from the dispenser. Alternatively, the flushing fluid may be permitted to exit the dispenser through the nozzle, as the chosen liquid would with the container in place. In this embodiment, the dispenser may include a basin and drain to catch and dispose of the flushing fluid after rinsing.

In one embodiment, the method to flush the dispenser after use may include: (1) coupling a container to the dispenser; (2) opening a valve to permit fluid to flow between a liquid conduit and the container; (3) closing a valve to stop fluid flow between the liquid conduit and the container; (4) removing the container from the dispenser; (5) opening a second valve to the flushing line; (6) flushing the dispenser; and (7) closing the second valve to the flushing line.

FIGS. 14A-B illustrate one embodiment of a flushing device 1400 to remove liquid from the dispensing system after use. In this embodiment, the liquid to the dispenser is removed from the dispenser connection device without a flushing fluid, reducing the likelihood that the liquid will become warm and stale at the dispensing location. By removing the liquid from the dispenser, it may be refrigerated along a conduit or below the dispensing location. Operation of the flushing device 1400 is described below.

First, a container (not shown), is placed on a dispenser 1402, which activates a pressure switch. The pressure switch opens a first valve 1404. A second valve 1412 is then opened to create a fluid flow path from the liquid conduit 1418 to the container. The second valve 1412 may be opened by an operator manually activating the valve by using a switch. During filling, a first collar 1406 and a second collar 1408 remain closed. A spring 1410, such as a rubber band, may be used to bias the collars in a closed position. The second valve 1412 may then be manually or automatically closed to shut off the fluid flow to the container. The container may then be removed from the dispenser 1402, deactivating the pressure switch. The pressure switch then turns the first valve 1404 off and simultaneously turns the second valve 1412 on, so the liquid line is still closed to the dispenser. However, liquid may reach the second collar 1408 and fill with fluid from the fluid line 1418 causing it to expand. The expanding second collar 1408 causes the first collar 1406 to draw the liquid from the dispenser down into the first collar 1406, while closing the seal 1414. The seal 1414 may prevent contaminants from entering the dispensing system while a container is not being filled. A guide rod 1416 may be used to permit the first and second collar to translate between an expanded and collapsed position appropriately.

Figure 15:
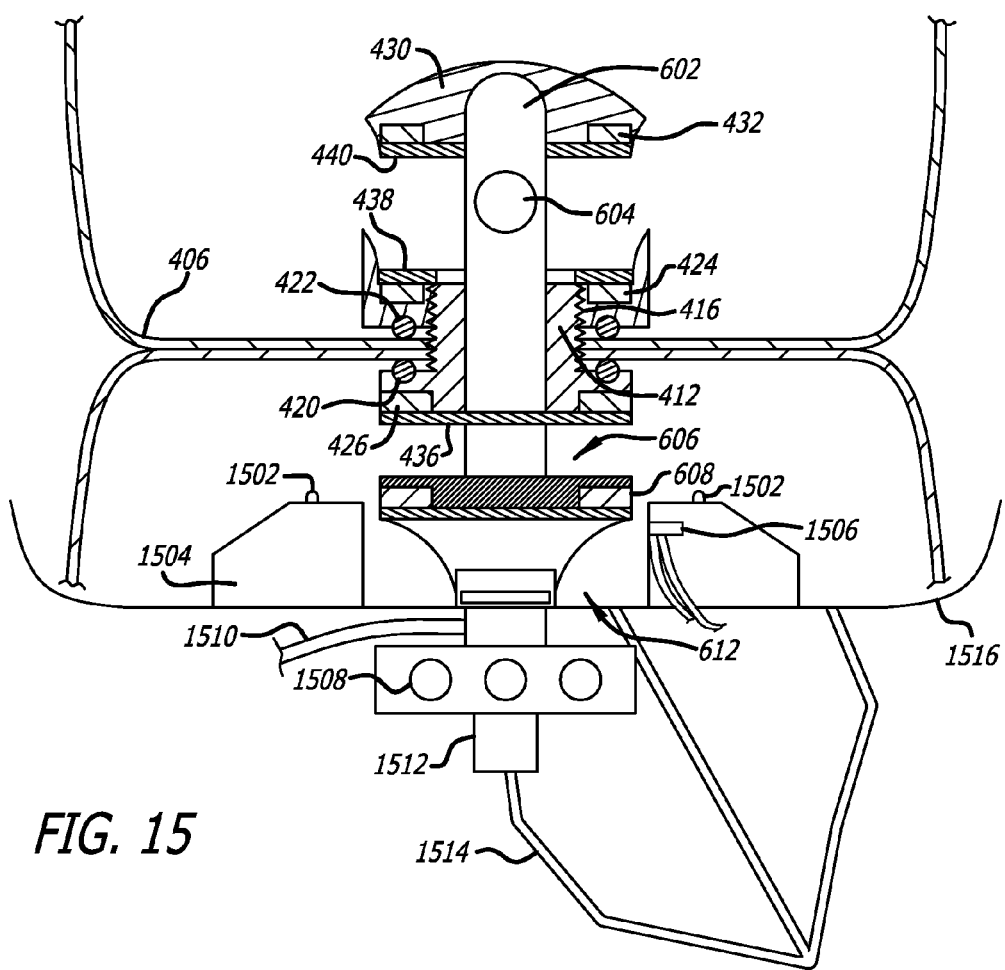
FIG. 15 illustrates an exemplary dispensing system including various embodiments as described herein, including the flushing device.

FIG. 15 illustrates an exemplary dispensing system including various embodiments as described herein, including the flushing device. FIG. 15 illustrates a representative dispensing system including features as described and illustrated in FIGS. 4A-B and FIG. 6. Features with like numbers represent similar components as described above. The container connection device includes a upper section 402 and lower section 404 threaded together through container 406. Seals 422 and 420, such as o-rings may be used to create a liquid tight seal between the container 406 and the container connection device. A cap 430 may create a valve for the container connection device. Seals 436, 438, 440, such as rubber gaskets, may be used to create liquid tight connections between the cap 430 and upper section 402, and the lower section 404 with the dispenser platform 606. Magnetic rings 432 and 424 bias the cap 430 closed, while magnetic rings 426 and 608 couple the container connection device to the dispenser connection device. Nozzle 602 pushes against cap 430 to overcome the magnetic attraction and open the valve of the container connection device. The magnets 432 and 424 attract one another; even while the nozzle 602 is pushing the cap 430 open, the attraction retains the cap 430 on the tip of the nozzle 602 during filling. Contouring of the cap 430 and nozzle 602 may assist in properly retaining the cap relative to the container connection device during the filling process.

In one embodiment, a tether, coil, spring or other device may be used to ensure the cap remains aligned with the bottom of the container and properly closes after the nozzle is removed. The cap may be made of a generally magnetic material, incorporate magnetic material, or may include a separate magnetic ring, or magnetic pieces to create the downward force. The corresponding magnet may be located inside or outside of the pitcher, as long as it draws the cap closed. Other embodiments may use other forces to close the cap, such as gravity or screwing.

In one embodiment, another pair of magnets may be used between the container and the dispenser. The container may use a separate magnet to attract the dispenser or it may use the same magnet used to attract the cap. These magnets may be used to stabilize the container while it is being filled. Other embodiments may use other forces to stabilize the pitcher, such as screwing or a mated fit between pitcher and base.

In one embodiment, the dispensing system may include decorative devices. For example LED lights 1502 may be included in housing 1504 and may flash or light up in various patterns depending on what liquid is selected, what container 406 is connected (e.g., pitcher or glass), whether the container is properly connected, etc. Also using light under the filling beverage to illuminate it may make the beverage look more appealing or appetizing. For example, an amber light under a darker beer may change the appearance thereof to appeal to a wider consumer base. Changing the tint of the light, or the color completely for different beers or certain drinks can be achieved. The light or lights may turn on when the pitcher is being filled, and may turn off when the pitcher is removed from the dispenser through various electrical, mechanical, or magnetic means. Alternatively, the lights could be modified to project images, messages or advertising on the container. The container 406 may also increase customer attention by rotating or moving as it fills. Housing 1504 may also include switches 1506 to control the dispenser or lights.

In one embodiment, the dispenser may be coupled to a fluid source. The dispenser may be coupled to one or more fluid sources through a manifold 1508 in order to couple multiple liquids to the same dispenser. A switch may be used to choose the desired liquid.

In one embodiment, a flushing device may be coupled to the dispenser. For example, a flushing line 1510 may be used to rinse the connections between uses. This may permit various beverages to be connected to the same dispenser and reduce or prevent unintentional contamination or intermixing of beverages. This may also prevent the beverage from sitting in connection lines and becoming warm or stale as discussed above. A drain valve 1512 may be include to provide an alternate path for the flushing fluid after rinsing. Drain lines 1514 may be coupled to the drain valve 1514 and the basin 1516 to remove any overflow fluid during filling or flushing fluid after cleaning.

In one embodiment, a lever in the appearance of a beer tap handle may be used as a switch to start and stop the filling of a container from the dispensing system. Alternative embodiments include other devices besides a tap handle to initiate the pour, including pushing a button to open a valve, turning a knob, or other devices known to start the flow of a pressurized liquid. The initiation of fluid flow may also be automatic by use of a pressure switch or by opening the fluid flow path through the connection of the container connection device with the dispenser connection device. A timer may alternatively be activated to fill the container depending on a programmed container size, such as a pint or pitcher. Other automatic devices, such as pressure switches may also be used to automatically turn off the fluid flow when the container is filled. Utilizing embodiments of the device and assembly may make tap handles purely aesthetic. The flow may be controlled by an electronic switch or other device. Therefore, the tap handles can be arranged any way based on aesthetics, utility, or personal preference.

Embodiments of the present system may be used to create layered shots of alcohol. By dispensing through the bottom of a glass, all one has to do is arrange the parts in the order they would like them to be in, filling the shot glass first from the bottom with the part that will be on the top. The assembly may be adjusted to reduce the flow through the filling device, depending on the application. Therefore, if the filler is used for shots of alcohol, the flow may be reduced to permit the liquor to seep into the shot glass. However, the flow may be increased if the device is used for beer, soda, or other beverages. The nozzle may also be designed with one or more apertures with associated dedicated conduits at various heights to permit filling by multiple liquids at the same time. For example, this embodiment may be used for layered beers such as a black and tan, or may be used with flavored sodas such as cherry coke.

A container connection device as disclosed herein may also be used with a removal system to drain the contents of a container after it has been filled by a dispenser. The removal system may be used, for example, as a "beer bong" to rapidly drain the contents from the container. The removal system may be coupled to the container connection device to rapidly remove the contents through a bottom of the container. For example, FIGS. 16A-B illustrate an exemplary embodiment of a removal system used with a container connection device as described herein.

Figures 16A, 16B:
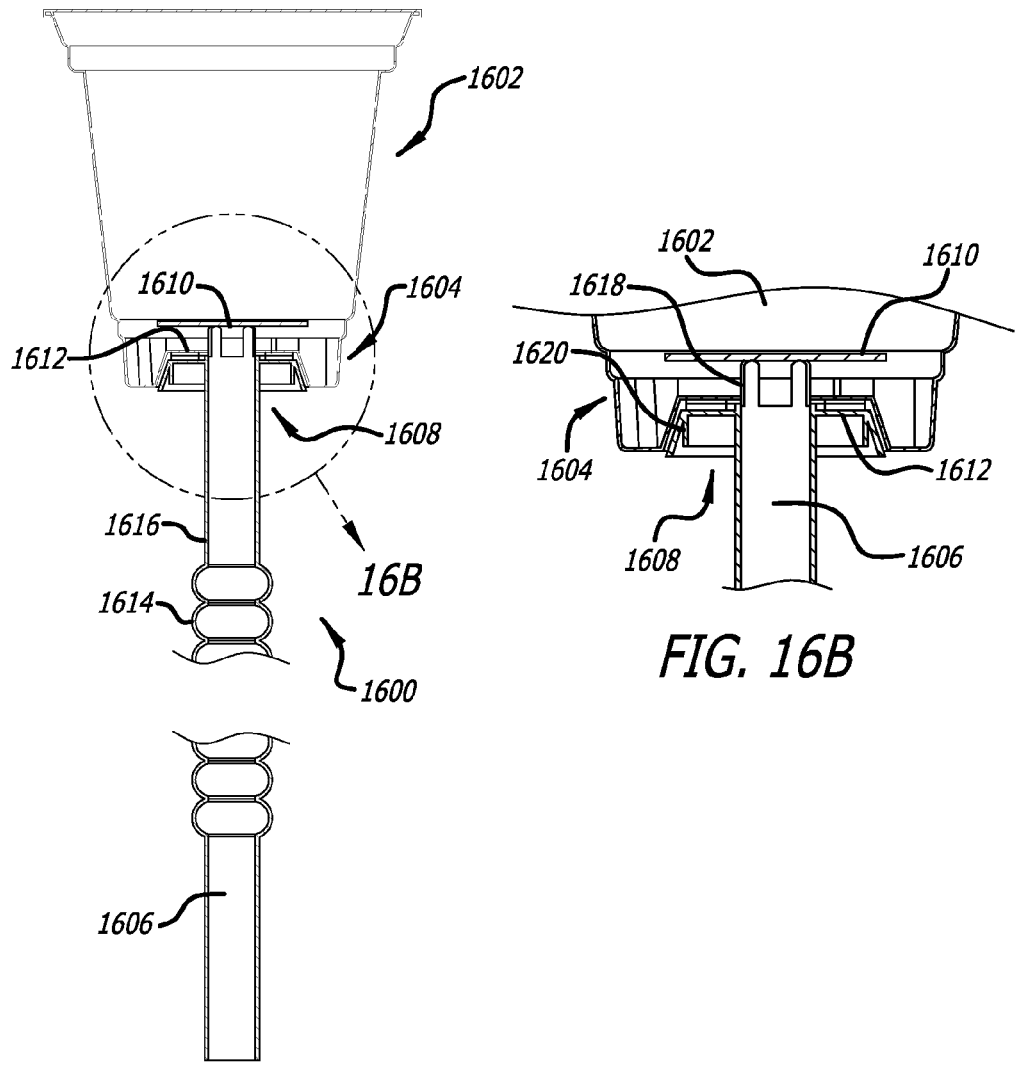
FIGS. 16A-B illustrate an exemplary embodiment of a removal system used with a container connection device as described herein.

FIGS. 16A-B illustrates an exemplary removal system 1600 used to dispense a beverage from a container 1602 through a bottom 1604 of the container. Generally, a rapid drain attachment 1616 may be coupled to a container 1602 to drain the contents through its bottom 1604. A conduit 1606 may be coupled to the rapid drain attachment 1616, and may be used to transfer the liquid from the container 1602 to a desired location. The coupling end of the rapid drain attachment 1616 may include a platform 1608 that aligns and interacts with a valve in the bottom of the container 1602. The interaction between the platform 1608 and the valve may permit fluid flow during removal, and may provide a seal between the rapid drain attachment 1616 and the container 1602 when connected. The valve may be a cap 1610 covering a hole or opening in the bottom of the container 1602. The cap 1610 may be normally biased closed to prevent the liquid from exiting the container 1602. The rapid drain attachment 1616 and cap 1610 may interact when coupled to permit liquid to flow between the container 1602 and conduit 1606.

In one embodiment, the cap 1610 may include a magnetic material or ferrous metal. To bias the cap normally closed, the bottom 1604 of container 1602 may include a ring 1612 that may include a magnetic material or ferrous metal that attracts the magnetic material in the cap 1610. A sealing feature (not shown), such as a gasket, may be used to ensure a liquid tight seal when the cap 1610 is seated in place under the influence of the ring 1612.

The rapid drain attachment 1616 may interact with cap 1610 to dispense the beverage from the container 1602. Rapid drain attachment 1616 may include a conduit 1606 to transport a liquid from the container 1602 to a desired location. The conduit 1606 may include a flexible portion 1614 to permit easy configuration of the fluid flow path to the desired location. The conduit 1606 may interact with the platform 1608 of the removal system 1600 in order to fill the container 1602. When the rapid drain attachment 1616 is coupled to the container 1602, fingers 1618 may be used to raise the cap 1610 of the container 1602, permitting liquid to flow between the container 1602 to the conduit 1606. In one embodiment, the rapid drain attachment 1616 may include a platform 1608 to seal the connection between the rapid drain attachment 1616 and the container 1602. The platform 1608 may include a ring 1620 that includes a magnetic material or ferrous metal to secure the ring 1612 of the container 1602, and thereby securing the connection of the rapid drain attachment 1616 to the container 1602 during content removal. Platform 1608 may additionally include a seal, such as a gasket, to reduce leaking between the rapid drain attachment 1616 and the container 1602.

The rapid drain attachment 1616 may be used after filling the container 1602, as described below. The container may be disconnected from the beverage dispenser and coupled to the rapid drain attachment 1616. In use, when the rapid drain attachment 1616 is coupled to the container 1602, fingers 1618 may push open cap 1610 of container. The rapid drain attachment 1616 may then be used to rapidly remove the container 1602 contents from a bottom 1604 of the container 1602, and potentially through a conduit 1606, which may further include a flexible portion 1614. As an example, the rapid drain attachment may be used with the beverage container, such as a pitcher, to create a "beer bong." Rapid drain attachment 1616 may further include an opening mechanism to trigger the fingers 1618 to open valve in the container 1602 and permit fluid flow out of the bottom 1604 of container 1602. The rapid drain attachment 1616 may alternatively or additionally include a valve at an outlet to stop the flow out of conduit 1606.

Figure 17:
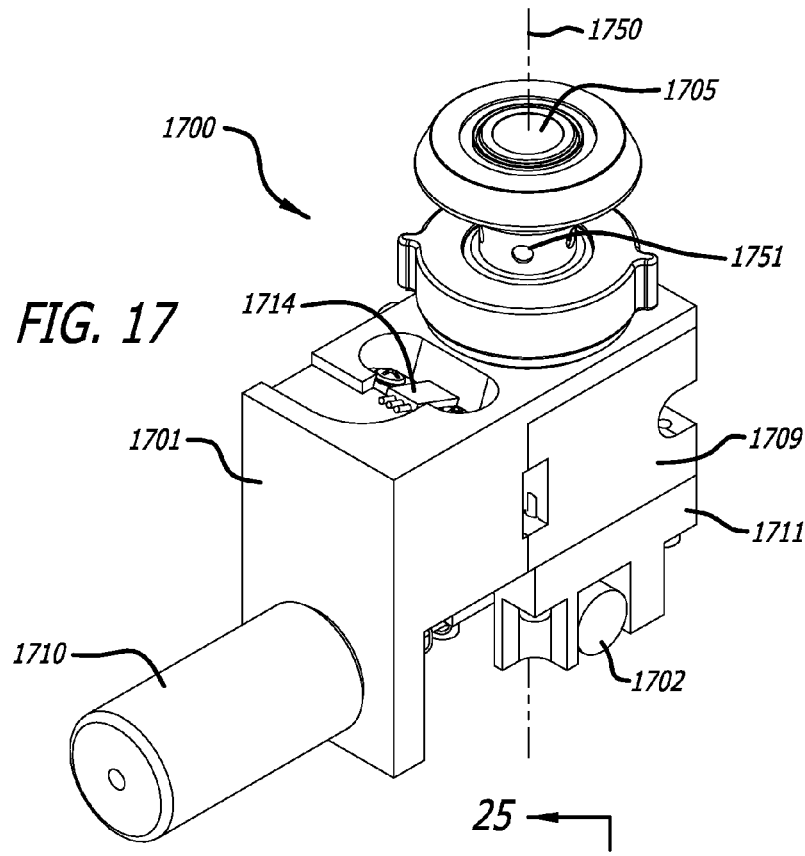
FIG. 17 illustrates a representative front, top, right perspective view of a valve of a dispensing system, in accordance with some embodiments.

FIG. 17 illustrates a representative front, top, right perspective view of a valve of a dispensing system, in accordance with some embodiments. Valve 1700 may include a housing body 1701, valve block 1709, and lower block 1711. Slide rod 1702 is coupled to the lower block 1711 and positioned within a recessed area of the lower block 1701. The recessed area is shaped to receive the slide rod 1702. The valve 1700 may also include a nozzle 1705 to couple the valve 1700 to a fluid container (not shown), a valve actuator assembly 1710 to transition the valve 1700 from a close position to an open position, and a fitting 1721 to couple the valve 1700 to a fluid source (not shown). One or more apertures 1751 of the valve 1700 serves as back pressure relief holes/vent holes. These vent holes allow the back pressure to be released from the filler if the cup is removed prematurely from the nozzle, and also permit leftover fluid to drain while the coupler is in the close position. As will be described in FIG. 25, the fluid may flow from the valve 1700 to the fluid container via a second set of apertures 2550. For referencing purposes, axis 1750 is illustrated and positioned through the valve 1700 and a center of the nozzle 1705 connecting longitudinally the nozzle 1705 with the housing body 1701, the valve block 1709 and the lower block 1711.

Figure 18:
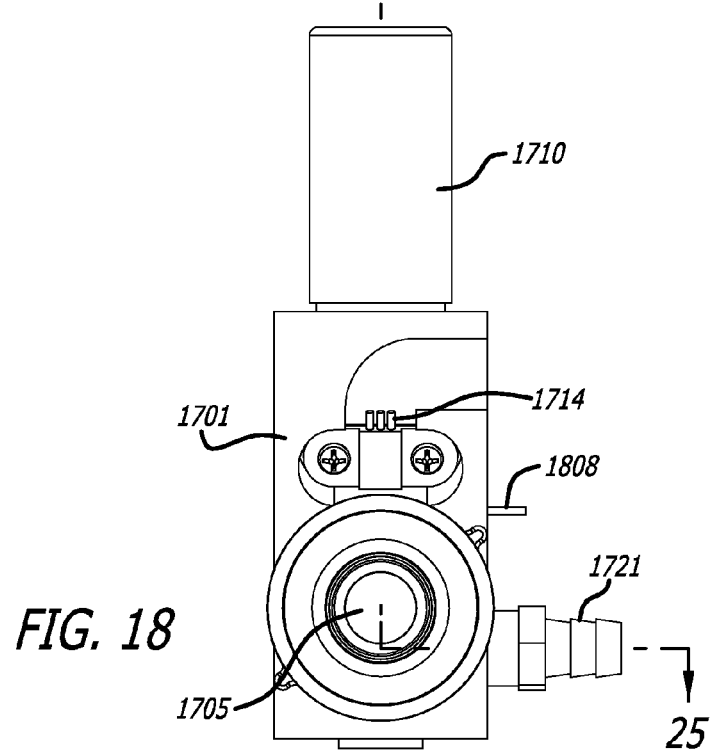
FIG. 18 illustrates a representative top plan view of a valve of a dispensing system, in accordance with some embodiments.

FIG. 18 illustrates a representative top plan view of a valve of a dispensing system, in accordance with some embodiments. In this view, the fitting 1721 is off to the right of the axis 1750. The valve 1700 may include one or more sensors such as, for example, container sensor 1714 to detect the presence of the fluid container and fluid sensor 1808 to keep track of the fluid flowing through the valve 1700. In one embodiment, the valve 1700 may be used with a processor (not shown) to control the electrical and/or mechanical dispensing logic associated with dispensing the fluid into the fluid container. In one embodiment, the valve 1700 may be configured to rotate the incoming fluid from the fluid source. The fluid sensor 1808 may then sense the rotational speed of the fluid, which is used by the processor to determine the amount of fluid to dispense into the fluid container. FIG. 19 illustrates a representative rear elevation of a valve of a dispensing system, in accordance with some embodiments. In this view, the fitting 1721 can be seen on the right of the axis 1750. FIG. 20 illustrates a representative left side elevation of a valve of a dispensing system, in accordance with some embodiments. In this view, the valve actuator assembly 1710 can be seen on the right of the axis 1750. The fluid may flow from the fluid source through the fitting 1721 into the valve 1700. In one embodiment, the fitting 1721 is offset from the axis 1750. This may cause the fluid to spin within the valve block 1709. The rotating fluid permits the valve 1700 to track the fluid flow using the fluid sensor 1808. Based on the number of rotations within an amount of time (angular speed of the fluid), the processor may calculate the volume of fluid dispensed by the valve 1700. Based on the volume of the fluid dispensed, the processor may close the valve 1700 when the coupled fluid container is filled to a desired level.

Figure 21:
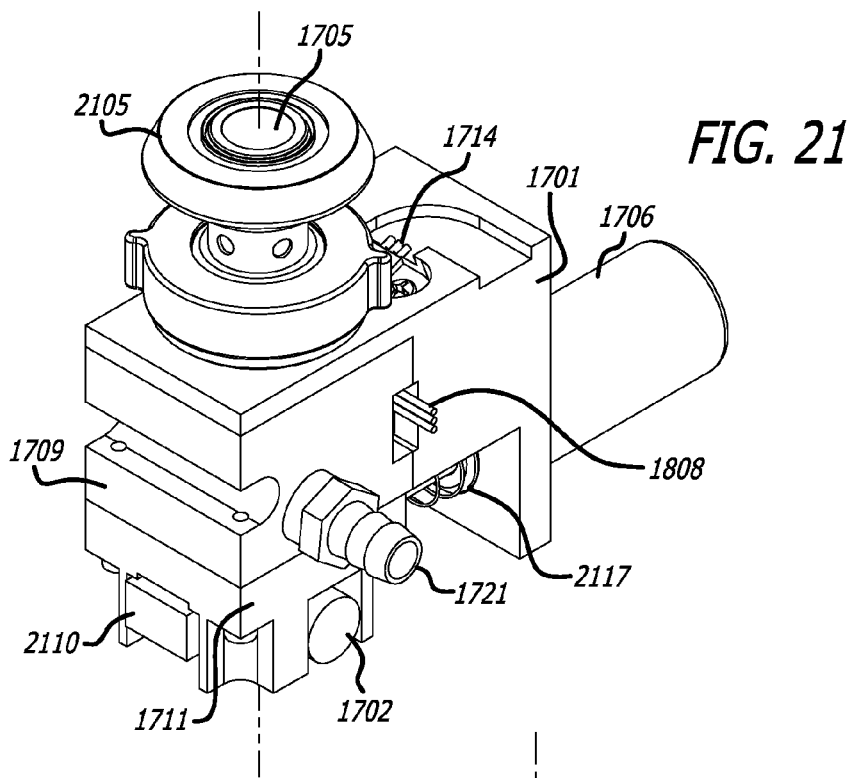
FIG. 21 illustrates a representative rear, left, top view of a valve of a dispensing system, in accordance with some embodiments.

FIG. 21 illustrates a representative rear, left, top view of a valve of a dispensing system, in accordance with some embodiments. The valve 1700 includes the housing body 1701, the valve block 1709, and the lower block 1711. The valve 1700 also includes the valve actuator assembly 1710, the fitting 1721 to a fluid source, and coupler 2105 to couple to a fluid container (not shown). In one embodiment, the valve actuator assembly 1710 may include a solenoid 1706, solenoid spring 2117, and solenoid plunger 2207 (see FIG. 22). When actuated, the solenoid 1706 moves the ramp 2110 toward the solenoid 1706. In one embodiment, the ramp 2110 includes a larger width end 2311 and a narrower width end 2312 (see FIG. 23). The top surface of the ramp 2110 is generally flat, while the bottom surface of the ramp 2110 has a wedge shape or is generally tapered from the larger width end 2311 to the narrower width end 2312. As the ramp 2110 is moved toward the solenoid 1706, the larger width end 2311 of the ramp 2110 is drawn toward the axis 1750 of the valve 1700. This movement of the ramp 2110 and its tapered bottom surface cause the slide rod 1702 to slide down relative to the housing body 1701, away from the valve 1700. The slide rod 1702 is coupled to a plunger shaft 2322 and a plunger 2326 (see FIG. 23). When the slide rod 1702 slides down relative to the housing body 1701, the plunger shaft 2322 and the plunger 2326 are pulled down, causing the valve 1700 to open. The solenoid spring 2117 is coupled to the solenoid 1706 and configured to return a plunger shaft 2322 (see FIG. 23) back to its original position after the solenoid 1706 has actuated, allowing the valve 1700 to close.

Figure 22:
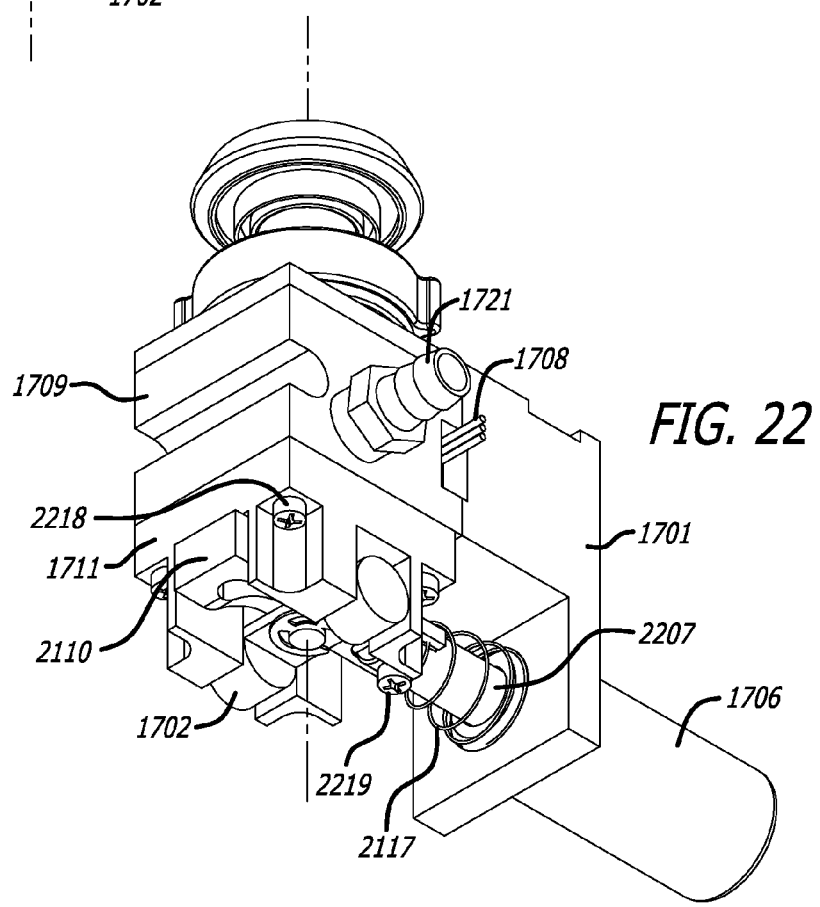
FIG. 22 illustrates a representative rear, left, bottom view of a valve of a dispensing system, in accordance with some embodiments.

FIG. 22 illustrates a representative rear, left, bottom view of a valve of a dispensing system, in accordance with some embodiments. Four screws 2218 may be used to couple the lower block 1711 to the valve block 1709. Two screws 2219 may be used to couple the ramp 2110 to the lower block 1711. In one embodiment, the solenoid spring 2117 may have a uniformly expanding diameter such that one end of the solenoid spring 2117 has a larger diameter than the diameter at the opposite end. In one embodiment, the larger diameter end of the spring 2117 is coupled to the housing body 1701 and the smaller diameter end is coupled to the lower block 1711. The solenoid plunger 2207 is positioned within the solenoid spring 2115 and is coupled to the solenoid 1706 and the ramp 2110.

Figure 23:
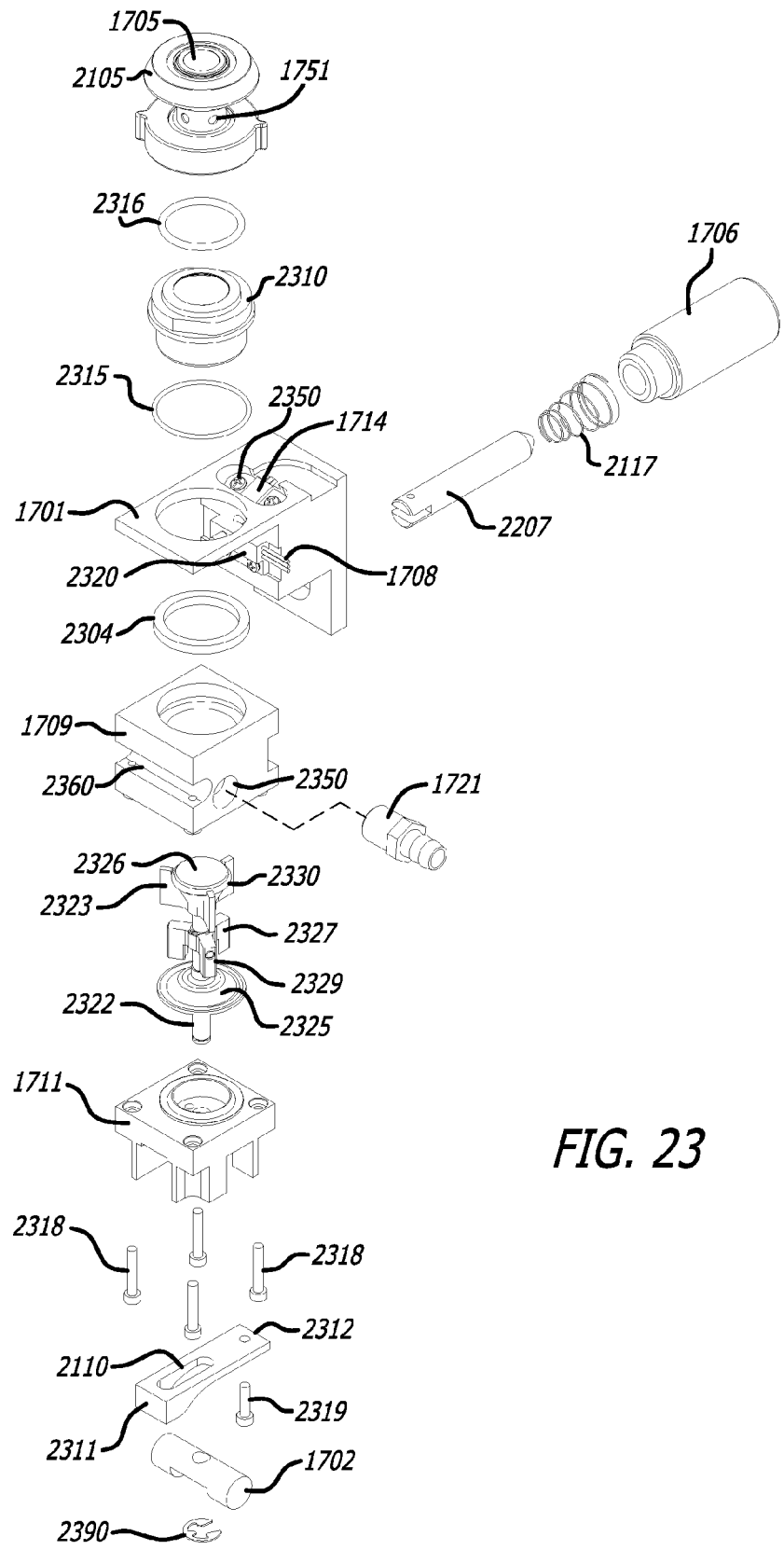
FIG. 23 illustrates a representative rear, left, top exploded view of a valve of a dispensing system, in accordance with some embodiments.

FIG. 23 illustrates a representative rear, left, top exploded view of a valve of a dispensing system, in accordance with some embodiments. Describing from the top of FIG. 23, the valve 1700 may include a nozzle 1705, a coupler 2105, a first o-ring 2316, a valve case 2310, a second o-ring 2315, and the housing body 1701. The coupler 2105 is configured to couple the valve 1700 to a fluid container (not shown). When a fluid container is properly positioned, the coupler 2105 may cause the bottom of the fluid container to open enabling it to receive the fluid from the valve 1700. The nozzle 1705 is configured to be coupled to the fluid container. The nozzle 1705 includes a mating plate to interface with a corresponding mating plate on the bottom of the fluid container. When the bottom of the fluid container is pressed onto the nozzle 1705, the mating plate of the nozzle 1705 is mated with the mating plate of the fluid container as the nozzle 1705 goes inside the fluid container and opens the bottom of the fluid container. Exemplary mating plates and coupling devices for the dispensing system and the fluid container are described herein. The coupler 2105 may be coupled to the valve 1700 at the valve case 2310 with the first o-ring 2316 or other seal between the valve case 2310 and the nozzle 1705. The second o-ring 2315 or other seal may be used between the valve case 2310 and the housing body 1701.

The housing body 1701 may include the container sensor 1714 and the fluid sensor 1708. A pair of screws 2350 may be used to couple the container sensor 1714 to the housing body 1701. A pair of screws 2320 may be used to couple the fluid sensor 1708 to the housing body 1701. The container sensor 1714 is configured to detect the presence and/or proper placement of a fluid container, and the fluid sensor 1708 is configured to detect the amount of fluid dispensed into the fluid container. For example, the container sensor 1714 may be a Hall effect sensor used for detecting a magnet within a base of the fluid container. Any magnetic material may be used. Other sensors may also be used, such as pressure sensors, or mechanical devices, such as push plates or buttons contacted by the coupled fluid container. The housing body 1701 may also be coupled to the solenoid plunger 2207, the solenoid spring 2117, and the solenoid 1706, which are used for opening and closing the valve 1700.

A third o-ring 2304 is positioned between the housing body 1701 and the valve block 1709. Coupled to the valve bock 1709 via opening 2350 is the fitting 1721. The fitting 1721 may include a barbed end in order to fit a fluid source conduit or tube. Other connections are also contemplated including a threaded mating member. The valve 1700 may include valve block 1709 and lower block 1711 along with housing body 1701 to enclose the valve components and to couple to the actuator assembly 1710. In one embodiment, a plunger 2326 is used to control the flow of the fluid. The plunger 2326 may close or seal the fluid flow path when in one position, and opens the fluid flow path when moved longitudinally to another position. For example, the plunger 2326 is coupled to plunger shaft 2322 connected to the actuator assembly 1710. In a closed position, the plunger 2326 rests against the valve case 2310 to seal the valve 1700 and prevent fluid flow from the valve 1700 to a fluid container. The actuator assembly 1710 may include the solenoid 1706, the solenoid spring 2117 and the solenoid plunger 2207. The solenoid plunger 2207 may directly or indirectly (through linkages) control the valve plunger 2326.

As shown in FIG. 23, the solenoid plunger 2207 is coupled to the ramp 2110. The ramp 2110 has a generally wedge shaped bottom surface, with the larger width end 2311 positioned away from the solenoid 1706. The slide rod 1702, coupled to the plunger shaft 2322, rests against the ramp 2110. When actuated, the solenoid 1706 pulls the solenoid plunger 2207 away from the housing body 1701 and toward the solenoid 1706. As the solenoid plunger 2207 is pulled, the coupled ramp 2110 is also pulled in the same direction, causing the wedged bottom surface of the ramp 2110 to gradually forces the slide rod 1702 downward and away from the housing body 1701 (along the axis 1750). The pulling of the solenoid plunger 2207 also causes the solenoid spring 2117 to coil. As the slide rod 1702 is forced downward, it pulls the plunger shaft 2322 along the axis 1750. This causes the plunger 2326 to move into the open position, open the value 1700, and permit a fluid flow path around the top of the plunger 2326. After the solenoid 1706 has actuated, the solenoid spring 2117 uncoils and returns the solenoid plunger 2207 and the ramp 2110 back to their original positions. This causes the plunger shaft 2322 and the plunger 2326 to return to their previous positions and close the valve 1700 and the fluid flow path. The linkages including the ramp 2110 and the slide rod 1702 permit the translation of the solenoid plunger 2207 to operate perpendicularly from the translation of the plunger shaft 2322. Thus, the valve 1700 and actuator assembly 1710 may be stored in a more compact area.

In one embodiment, the plunger shaft 2322 includes a turbine 2327 having two or more fins. When the fluid enters the valve block 1709 via the fitting 1721, it is off axis and thus rotates around the valve axis 1750. The rotating fluid spins the turbine 2327. The turbine fins may include magnets 2329 that are detected by the fluid sensor 1708. The fluid sensor 1708 may be a Hall effect sensor to detect the presence of the magnets 2329. As the turbine 2327 rotates, the magnet is sensed. The number of rotations may be used by the processor to calculate the fluid flow rate. From the fluid flow rate, the desired volume may be dispensed by allowing the fluid to flow for the required amount of time. Various sensors and sensing systems may be employed to sense the fluid dispense. The valve 1700 may also include a flow guide 2323 near the plunger 2326 in order to direct the fluid flow and reduce the flow rotation. The flow guide 2323 may also be used to guide the plunger shaft 2322 so that a fourth o-ring 2330 (e.g., a plunger seal) is properly seated within the valve case 2310 to close the valve 1700.

In one embodiment, the valve 1700 uses a diaphragm 2325 with a pressure plate (not shown) under it to equalize the pressure inside the valve 1700. The pressure of the fluid pushes down on the diaphragm 2325 and pressure plate (not shown) with the same force as the pressure plate pushes up on the plunger 2326. Thus, it is possible to open the valve 1700 with less force, allowing a much smaller solenoid 1706 than would otherwise be required and eliminates the need for a wiper seal, which may be costly and provide design complications. The valve 1700 may also include a temperature controlled system to control the temperature of the fluid during dispensing. A conduit 2830 (see FIG. 28) may clip into the notch 2360 of the valve block 1709. The conduit 2830 may be a copper tube. Fluid conduits may be run along the conduit 2830 as they enter the valve 1700. For example, chilled fluid may be run through the conduit 2830 to enable the fluid to remain cold while it is dispensed.

O-rings or other seals may be used to couple the various components of the valve 1700. For example, the first o-ring 2316 may create a seal between the valve case 2310 and the nozzle 1705, the second o-ring 2315 may create a seal between a drain pan (not shown) and the valve case 2310, and the third o-ring 2304 may create a seal between the valve case 2310 and the valve block 1709. Various mechanical devices may be used to couple the components together, such as screws, adhesives, bonding, etc. For example, screws 2318 may be used to hold the lower block 1711 to the valve block 1709, and screw 2319 may be used to hold the ramp 2110 to the solenoid plunger 2207. Retaining ring 2390 may be an e-clip to hold the slide rod 1702 onto the plunger shaft 2322. Retaining ring 2328 may be used to hold the turbine 2327 in place. There may be one retaining ring 2328 above and another retaining ring 2328 below the turbine 2327.

Figure 24:
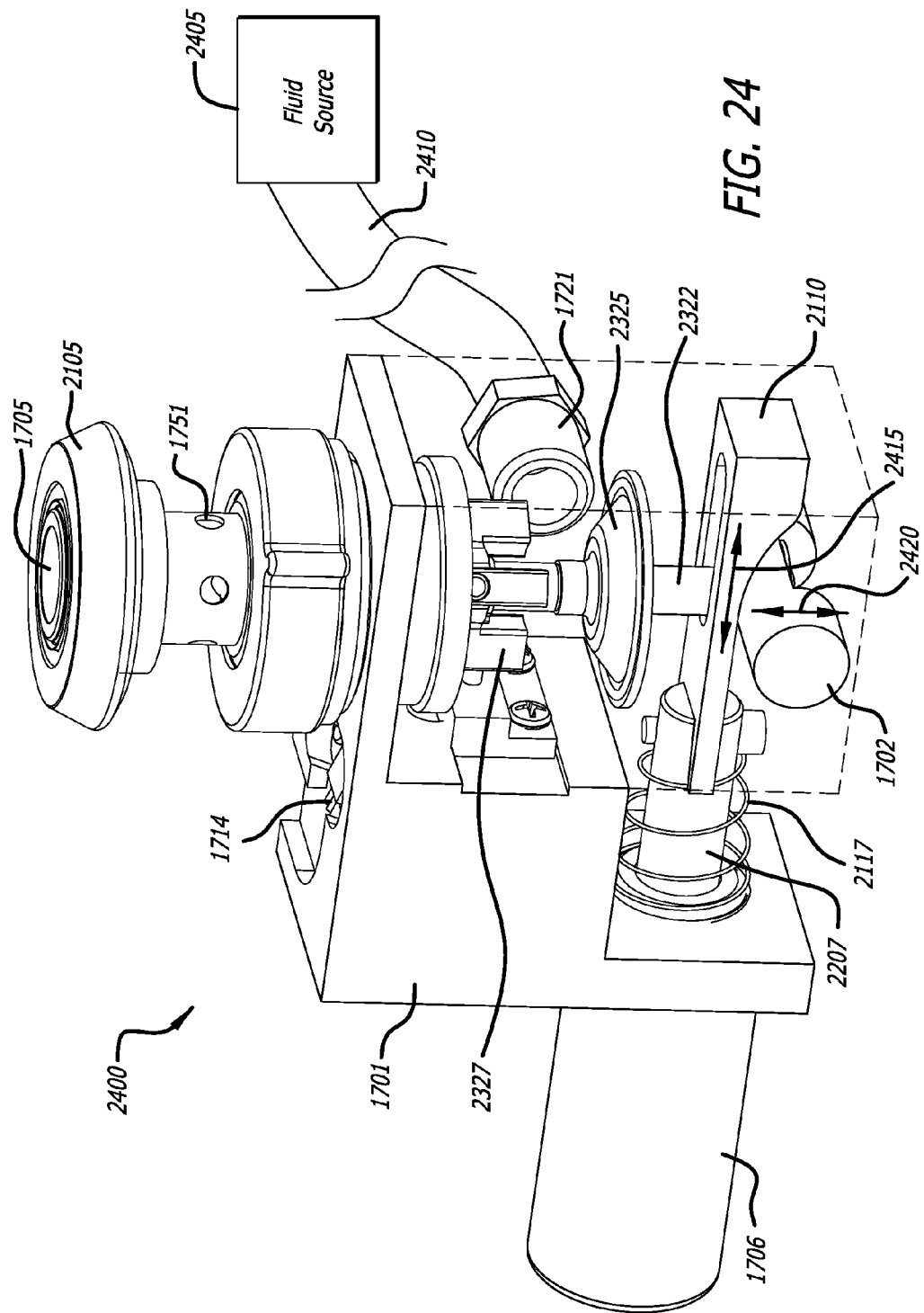
FIG. 24 illustrates a representative rear, right, top view of a valve with the valve block and the lower block shown in broken lines to illustrate some internal components of the valve, in accordance with some embodiments.

FIG. 24 illustrates a representative rear, right, top view of a valve with the valve block and the lower block shown in broken lines to illustrate some internal components of the valve, in accordance with some embodiments. Diagram 2400 includes the housing body 1701 and some of the components of the valve 1700. This includes the slide rod 1702, the ramp 2110, the solenoid spring 2117, the solenoid plunger 2207, and the solenoid 1706. The diagram 2400 also includes the plunger shaft 2322, the diaphragm 2325, and the turbine 2327. The ramp 2110 has a generally wedge shaped bottom surface, with a larger width end 2311 and a smaller width end 2312, where the larger width end 2311 is positioned away from the solenoid 1706. The ramp 2110 is coupled to the solenoid plunger 2207 at the smaller width end 2312. When actuated, the solenoid 1706 pulls the solenoid plunger 2207 away from the housing body 1701 toward the solenoid 1706 along one direction of the double arrow 2415. The wedged bottom surface of the ramp 2110 forces the slide rod 1702 down, away from the housing body 1701 along one direction of the double arrow 2420. As the slide rod 1702 is forced downward, it pulls the plunger shaft 2322 down, causing the valve 1700 to open and creating a fluid flow path. As the solenoid plunger 2207 is pulled by the solenoid 1706, the solenoid spring 2117 is coiled. The solenoid spring 2117 then uncoils and returns the solenoid plunger 2207 back to its original position along the other direction of the double arrow 2415 after the solenoid 1706 has actuated. Returning the solenoid plunger 2117 to its original position causes the slide rod 1702 to push the plunger shaft 2322 upward along the other direction of the double arrow 2420, causing the valve 1700 to close. The opening and closing of the valve 1700 affects the flow of the fluid from the fluid source such as, for example, the beverage supply 2405 via source hose 2410.

Figure 25:
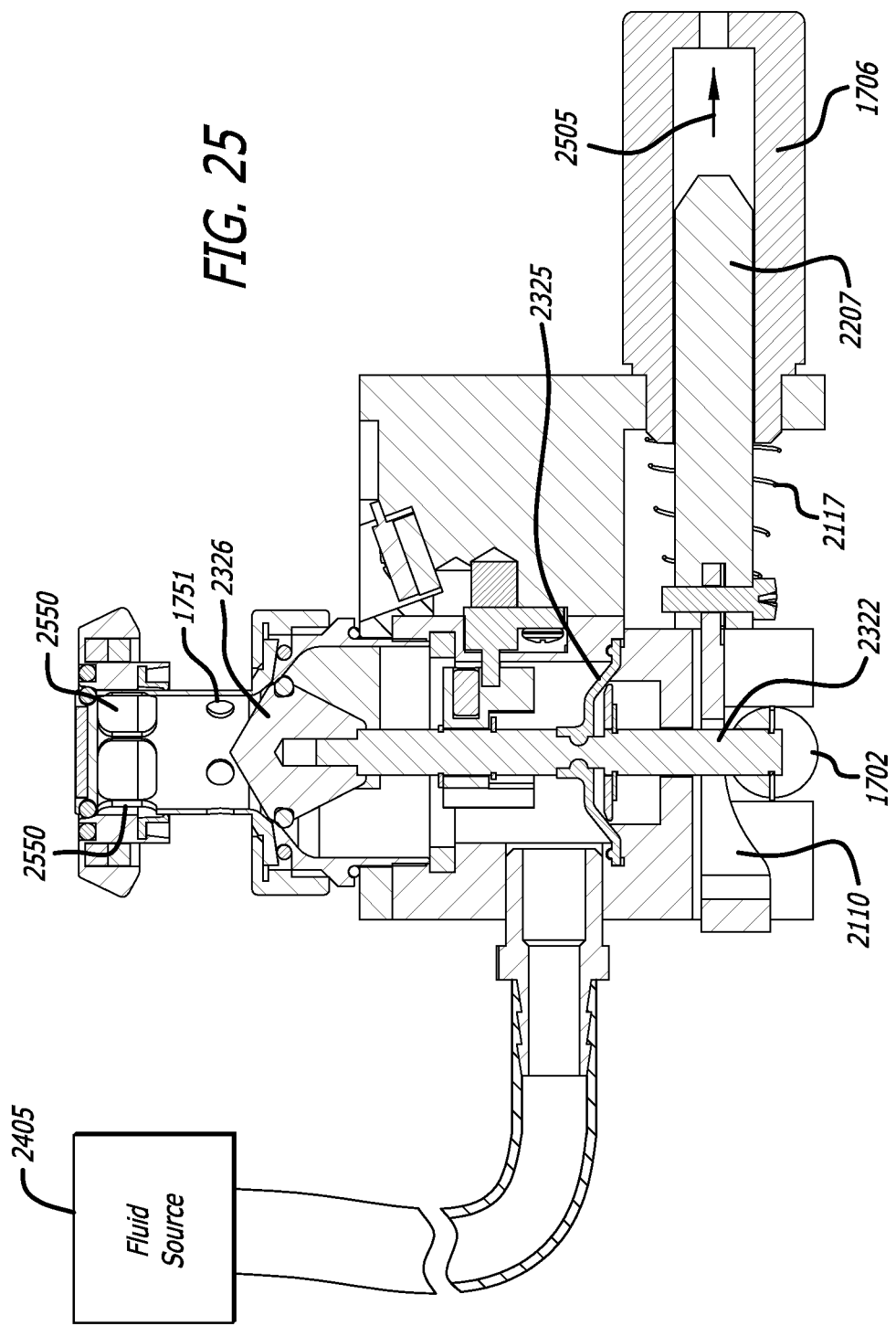
FIG. 25 illustrates a representative cross section view of a valve showing the solenoid in a position when the valve is closed, in accordance with some embodiments.

FIG. 25 illustrates a representative cross section view of a valve showing the solenoid in a position when the valve is closed, in accordance with some embodiments. When the solenoid 1706 is in the position illustrated in FIG. 25, there is no fluid flowing from the valve 1700 to a coupled fluid container (not shown). The plunger 2326 is pushed upward against the valve case 2310 closing any fluid path to the nozzle 1705. When the valve 1700 is closed, a portion of the solenoid plunger 2207 is within the housing body 1701. This may be considered as the original position of the solenoid plunger 2207. Also shown in FIG. 25 are the fluid apertures 2550 where the fluid flows from the valve 1700 into the fluid container.

Figure 26:
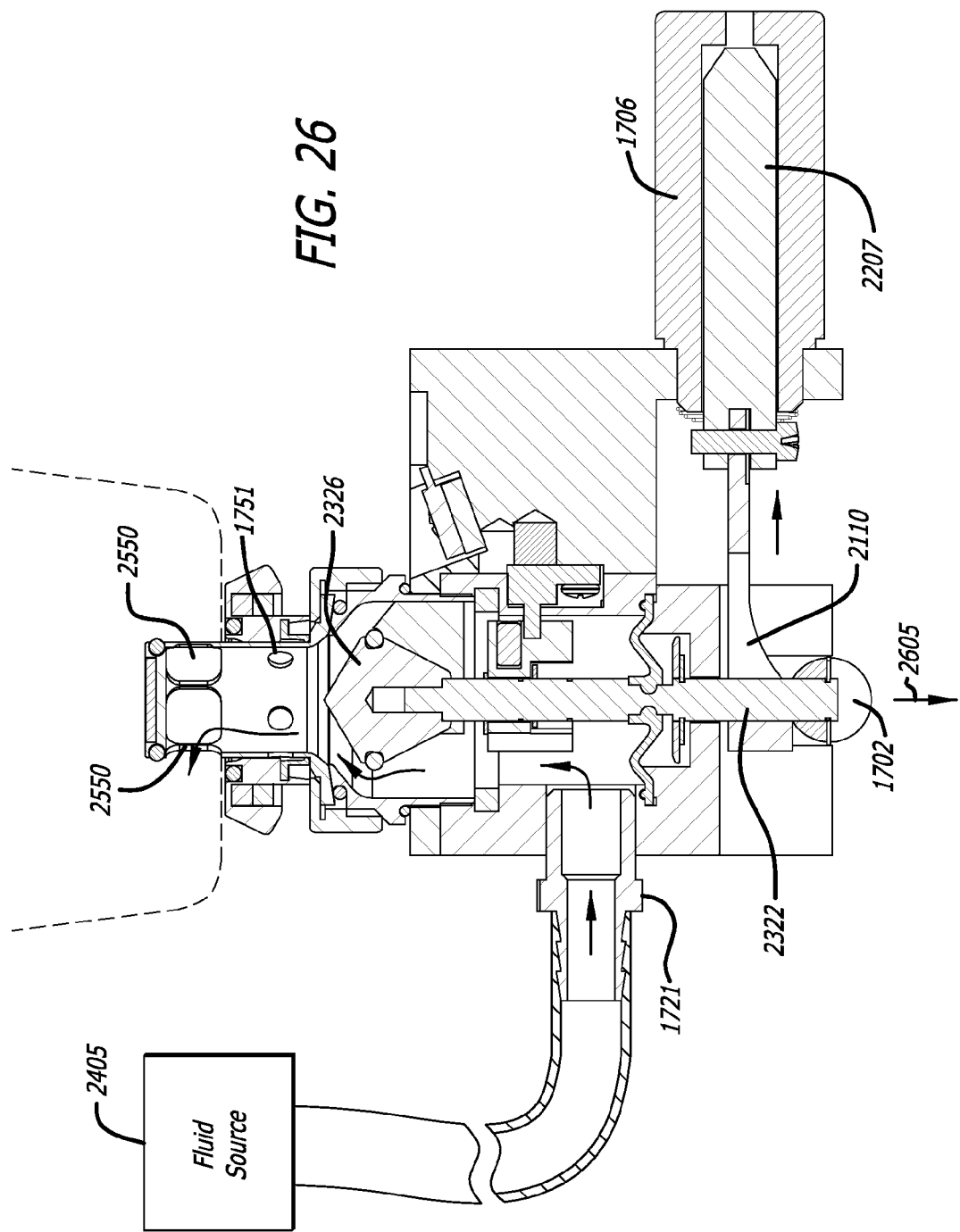
FIG. 26 illustrates a representative cross section view of a valve showing the solenoid in a position when the valve is open, in accordance with some embodiments.

FIG. 26 illustrates a representative cross section view of a valve showing the solenoid in a position when the valve is open, in accordance with some embodiments. As the solenoid 1706 pulls the solenoid plunger 2207 away from the housing body 1701 and in the direction of the arrow 2505 (see FIG. 25), the ramp 2110 is pulled in the same direction as the arrow 2505. Based on the ramp 2110 having a wedged bottom surface, the slide rod 1702 is pushed downward in the direction of the arrow 2605 while the ramp 2110 moves in the direction of the arrow 2505. When the slide rod 1702 is pushed downward, the plunger shaft 2322 also moves downward in the direction of the arrow 2605. This causes the plunger 2326 to move downward and creates an open flow path, allowing the fluid to flow from the beverage supply 2405 through the fitting 1721 and the housing body 1701, out of the valve 1700 via the apertures 2550, and into a fluid container (not shown).

Figure 27A:
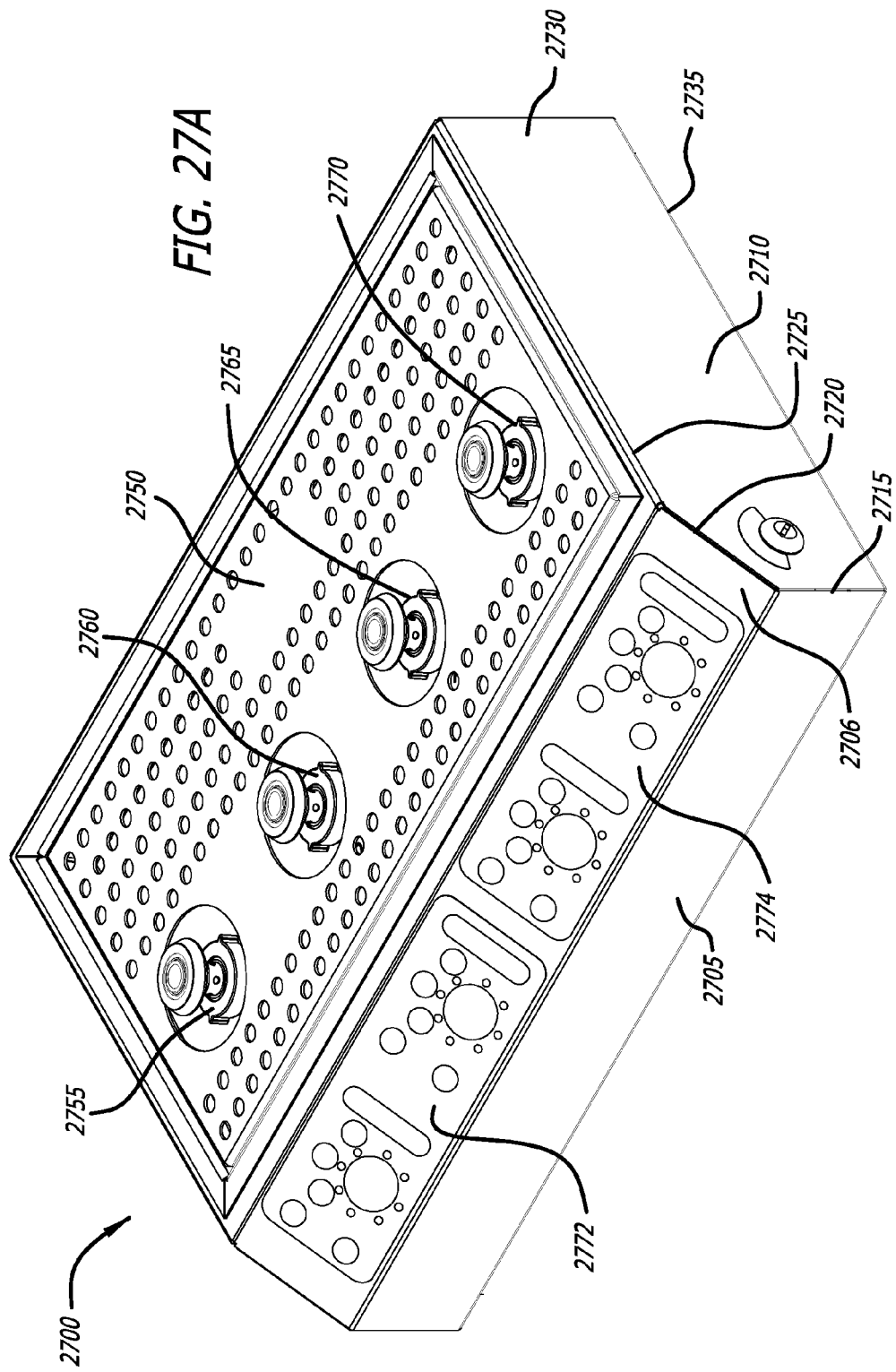
FIG. 27A illustrates a representative front, top, right view of a housing of a dispensing system having multiple valves, in accordance with some embodiments.

FIG. 27A illustrates a representative front, top, right view of a housing of a dispensing system having multiple valves, in accordance with some embodiments. The dispensing system housing 2700 includes a first front wall 2705 coupled to a second front wall 2706. The second front wall 2706 is coupled to a top wall 2807, which in turn is coupled to a back wall 2808. The second front wall 2706 is connected to and positioned between the first front wall 2705 and the top wall 2807 at an angle. In one embodiment, the second front wall 2706 may be configured to display a user interface to allow a user to select options, view status, etc. The housing 2700 also includes a first side wall 2710 and a second side wall 2810. Each of the first side wall 2710 and the second side wall 2810 has five edges. The first edge has a length dimension 2715 which is the same as the width of the first front wall 2707. The second edge has a length dimension 2720 which is the same as the width of the second front wall 2706. The third edge has a length dimension 2725 which is the same as the width of the top wall 2807. The fourth edge has a length dimension 2730 which is the same as the width of the back wall 2808. The fifth edge has a length dimension 2735 which is the same as a distance from a bottom of the first front wall 2705 to the bottom of the back wall 2808. In one embodiment, the dispensing system housing 2700 may include one or more openings to receive one or more valves 1700. The one or more openings may be in the top wall 2807. For example, the top wall 2807 includes four openings (not shown) to receive four valves 2755, 2760, 2765 and 2770. Illustrated in FIG. 27A are the four nozzles and couplers of the valves 2755-2770. The remaining portions of the four valves 2755-2770 are hidden from view by the top wall 2807. The external surface of the top wall 2807 may be considered a filling area.

In one embodiment, a platform 2750 may be used with the top wall 2807. For example, the platform 2750 may be placed over the top wall 2807 and is configured such that there is a clearance between a surface of the platform 2750 and a surface of the top wall 2807, providing an elevated platform. There may be multiple openings in the surface of the platform 2750. These openings allow any fluid spillage to go from the surface of the platform 2750 (the dispensing platform) to the surface of the top wall 2807 (the filling area). In one embodiment, the dispensing system may also include a drainage system around the filling area. The drainage system may remove any spilled fluid from the dispensing platform and use conduits or tubes to transport the fluid to a disposal system, such as a drain or sink. The drainage system may surround the dispensing system or dispensing platform to keep the serving area relatively free from standing liquid. The platform 2750 also includes openings to accommodate the valves 2755-2770 and the bottom of corresponding fluid containers. The combination of the dispensing system housing 2700 and the valves 2755-2770 together with the connections to the fluid source provides an integrated dispensing system that may be placed on an existing counter top or may be incorporated into a counter or serving surface.

In one embodiment, the dispensing system may include a user interface that provides filling options for an attached fluid container. An example of the user interface is illustrated on the second front wall 2706. For example, the second front wall 2706 may include a first user interface section 2772 and a second user interface section 2774. The first user interface section 2774 may include options associated with the valve 2755 and similar options associated with the valve 2760. The second user interface section 2774 may include options associated with the valve 2765 and similar options associated with the valve 2770.

Figure 27B:
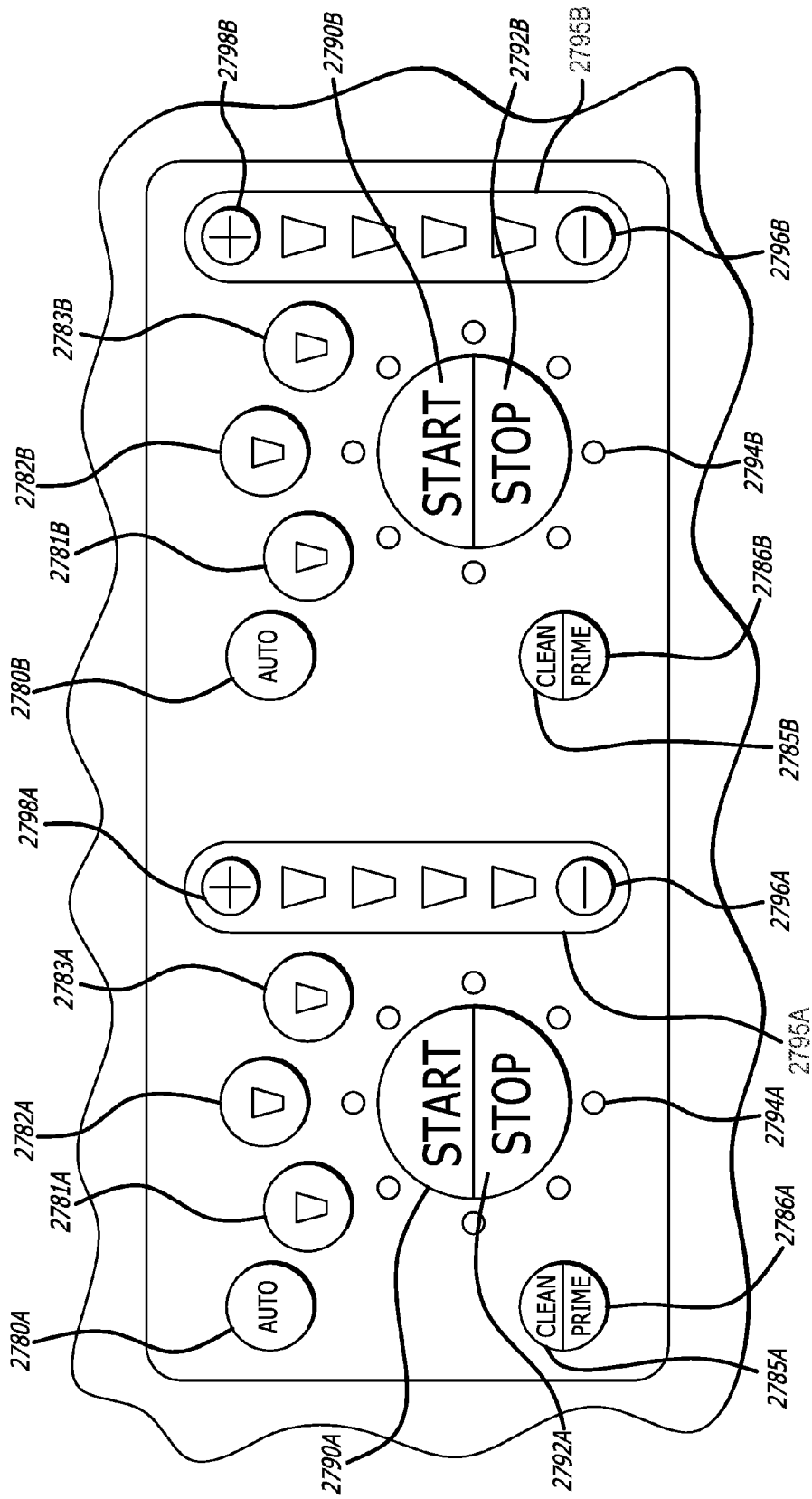
FIG. 27B illustrates a representative close up view of the user interface, in accordance with some embodiments.

FIG. 27B illustrates a representative close-up view of the user interface, in accordance with some embodiments. The user interface may include options for automatic, semi-automatic or manual control. The diagram illustrated in FIG. 27B may correspond to the first user interface section 2772. For automatic filling, the container size and/or filling level may be selected. For example, to set the automatic mode, the automatic option 2780A may be selected, and then one of the container size options 2781A, 2782A and 2783A may be selected. In this mode, when a fluid container is properly placed into the filling platform, the fluid is automatically dispensed into the fluid container, and the fluid flow is automatically stopped after a pre-determined volume of fluid has been dispensed. The volume of fluid to be dispensed is determined based on the selected container size option. The user interface may include the start option 2790A and the stop option 2792A, which may be used in the manual mode or semi-automatic mode. For example, in full manual mode, the user can start dispensing the fluid into the fluid container by selecting the start option 2790A. The user can then select the stop option 2792A at the appropriate time to stop the fluid flow into the fluid container.

In the semi-automatic mode, the user may select the automatic option 2780A, select one of the container size options 2781A-2783A and cause the fluid to flow automatically into the fluid container by properly placing the fluid container onto the filling platform. In this example, instead of waiting for the fluid flow to stop automatically the user may select the stop option 2792A prior to the pre-determined volume of fluid is dispensed into the fluid container. As another example of using the semi-automatic mode, the user may select one of the container size options 2781A-2783A, place a fluid container onto the dispensing platform, and then manually select the start option 2790A. The dispensing system may then dispense the fluid into the fluid container and stops dispensing after an appropriate volume of fluid is dispensed. The volume to be dispensed is based on the selected container size.

The nozzle 1705 is generally in a closed position and includes a raised mating plate. With the mating plate raised, the apertures 2550 within the nozzle body are closed. When a fluid container is coupled to the nozzle 1705, the mating plate is pushed down along the nozzle 1705 and the axis 1750, the apertures 2550 are open creating a fluid flow path between the dispensing system and the coupled fluid container.

The user interface may also include cleaning option 2785A and priming option 2786A. Status information may also be displayed on the user interface. The status information may indicate to the user whether the dispensing system is ready to dispense. In one embodiment, the status information may be implemented using a visible indicator such as a light. For example, the user interface may set the light 2794A to display a green color indicating that the dispensing system is ready to dispense, or it may set the light 2794A to display a red color indicating that the dispensing system is not ready to dispense. As another example, a set of green lights positioned around the start and stop options 2790A, 2792A may be illuminated to indicate that the nozzle of the corresponding valve is open. A set of red lights may be similarly positioned and may be illuminated when the corresponding valve is closed. As mentioned, the container sensor 1714 may be used to detect the presence and/or the proper placement of the fluid container onto the dispensing platform, and the fluid sensor 1708 may be used to determine the volume of fluid dispensed.

In one embodiment, the user interface may also include fluid volume options 2795A to control the fluid volume (or fill level) to be automatically dispensed into a fluid container. For example, the user may use the decrease option 2796A (e.g., a button with a minus sign) to decrease the volume and the increase option 2798A (e.g., a button with a plus sign) to increase the volume. Although not shown, the user interface may include other controls, user information, or indicators.

The first user interface section 2772 is illustrated to include another user interface for a second valve and configured to have the same set of options. This includes the automatic option 2780B, the container size options 2781B, 2782B, 2783B, the cleaning option 2785B, the priming option 2786B, the start option 2790B, the stop option 2792B, the light(s) 2794B, the fluid volume options 2795B, the fill level decrease option 2796B and increase option 2798B, and so on. For one embodiment, each of the valves and corresponding user interfaces may be associated with a same type of beverage or a different type of beverage.

The options in the user interface may include electrical or mechanical options such as, for example, touch screen, buttons, toggles, switches, dials, knobs, lights, sounds, etc. In one embodiment, the user interface is associated with electronic components including the processor. The user interface and electronics may be separated from the valve and fluid source by a dividing plate 2825 (see FIG. 28). The dividing plate 2825 may also include openings to provide air flow and to reduce overheating of the electronic components. Locking mechanism 2835 may be used to keep the dividing plate 2825 in place.

Figure 28:
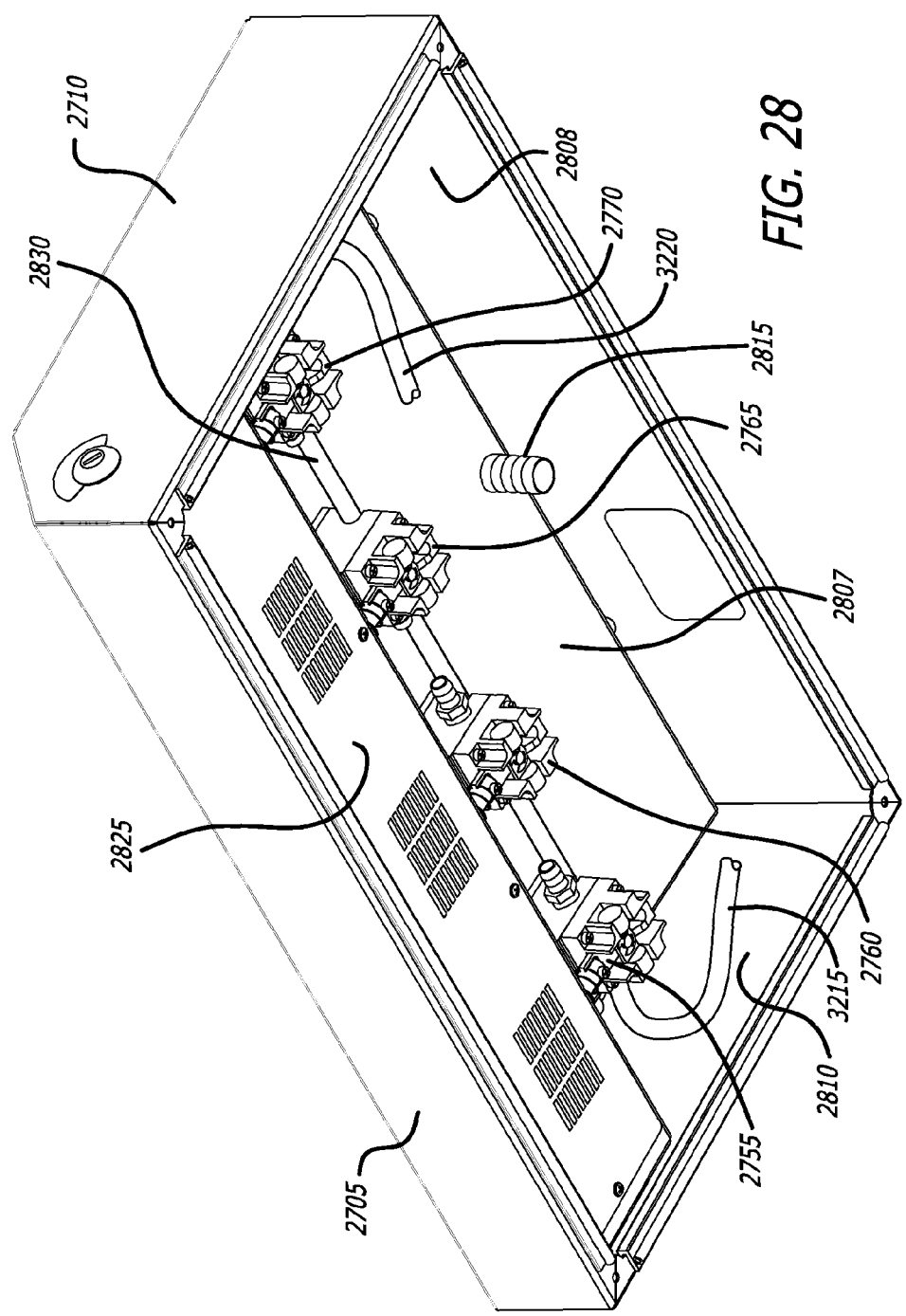
FIG. 28 illustrates a representative bottom, front, right view of a dispensing system having multiple valves, in accordance with some embodiments.

FIG. 28 illustrates a representative bottom, front, right view of a dispensing system showing the multiple valves, in accordance with some embodiments. The four valves illustrated in FIG. 28 correspond to the four valves 2755-2770 illustrated in FIG. 27 and reflect the portions of the valves 2755-2770 that are not visible in FIG. 27. As illustrated, the valves 2755-2770 are not connected to any fluid sources. In one embodiment, the top wall 2807 may also include an opening to receive a drain fitting 2815 to drain any fluid that may be spilled onto the filling area. In the current example, the drain fitting 2815 is positioned near the back wall 2808. The drain fitting 2815 may be coupled to a drain conduit (not shown). The drain conduit may couple a drainage area from the filling area of the dispensing system to a drainage location such as, for example, a floor drain or a sink. The drain conduit may be a tube connecting the drainage area with the drainage location. A conduit 2830 may clip into the valves 2755-2770 to deliver temperature regulated fluid. Fluid conduits may be run along the conduit 2830 so that the fluid may remain at a desired temperature during transport. The regulated fluid may be transported generally in parallel to the fluid conduits, or may generally coil or wrap around the fluid conduits. The regulated fluid and the fluid from the fluid source may also be run through cooperating conduits, such as concentric conduits. A pump may be used to transport the regulated fluid from a source to the valve of the dispensing system. A temperature regulator may use heated or cooled regulated fluid, liquid or gas, to maintain the temperature of the regulated fluid and therefore the temperature of the fluid from the fluid source.

Figure 29:
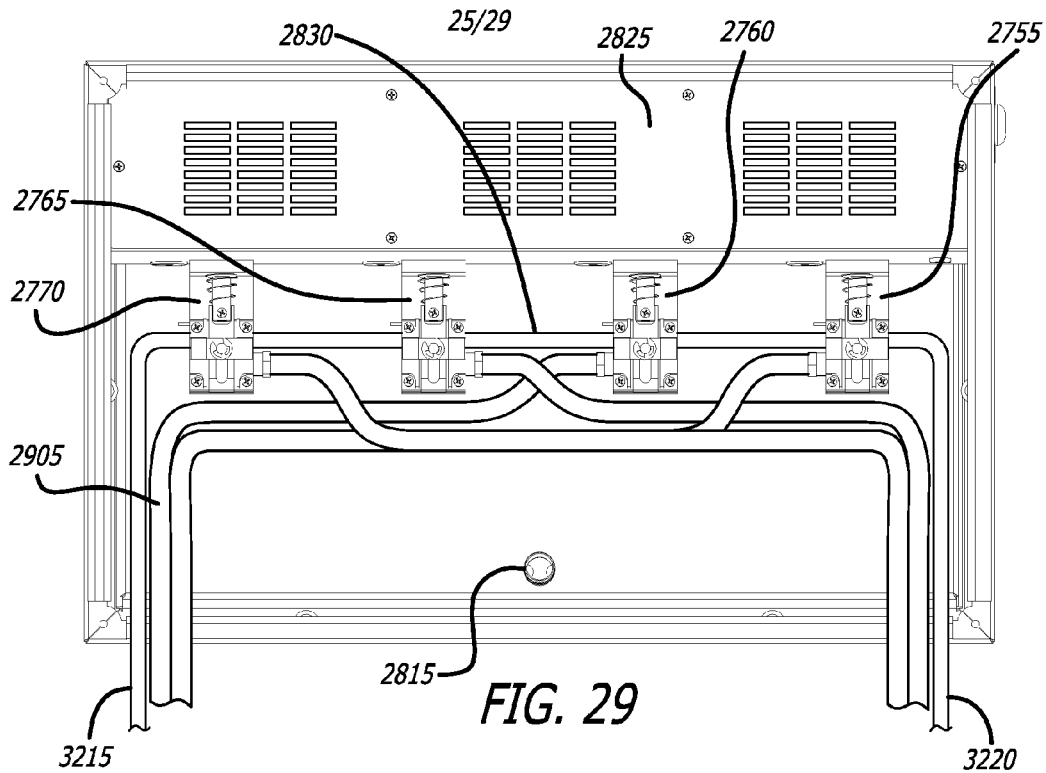
FIG. 29 illustrates a representative bottom view of a dispensing system showing source tubes connected to valves, in accordance with some embodiments.

FIG. 29 illustrates a representative bottom view of a dispensing system showing source tubes connected to the valves, in accordance with some embodiments. The source conduit 2905 may be coupled to a fitting (e.g., fitting 1721), or it may be directly coupled to a valve (e.g., valve 2755). The fitting may be barbed or threaded which directly or indirectly couples to a source conduit 2905. The source conduit 2905 may be a tube. There is one source conduit 2905 for each valve. Illustrated in the current example are four source conduits for four valves. A threaded member is coupled to the valve to connect to a corresponding threaded member from the source conduit 2905.

Figure 30:
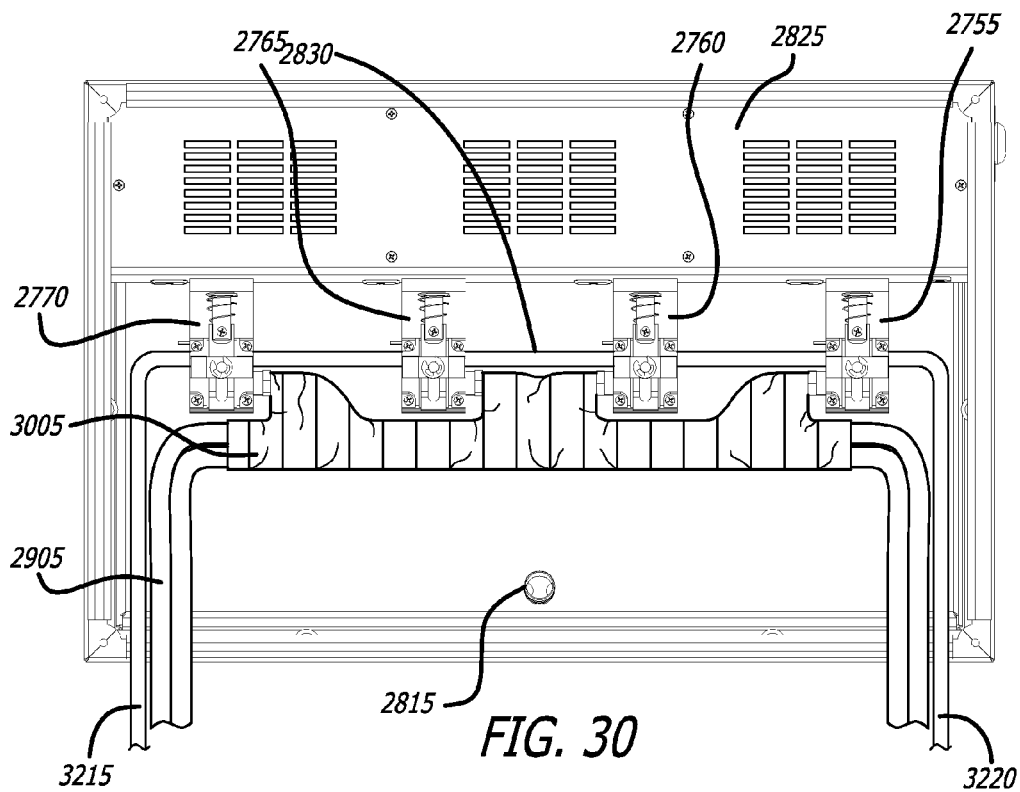
FIG. 30 illustrates a representative bottom view of a dispensing system showing the source tubes with a first layer of insulation, in accordance with some embodiments.

FIG. 30 illustrates a representative bottom view of the dispensing system showing the source tubes with a first layer of insulation, in accordance with some embodiments. As illustrated, the first layer of insulation 3005 may be wrapped around portions of the source conduit 2905 that are in between the valves 2755-2770. The source conduits may be insulated to retain the temperature of the fluid at a desired level. As mentioned, the conduit 2830 may also be included to provide a heat transfer system to continually cool or heat the fluid at the desired temperature. The conduit 2830 may be coupled to the source conduits 2905 to pass cold water, which provides a cooling source for the fluid being transported. For one embodiment, the first layer of insulation 3005 may include a layer of aluminum material and then a layer of foam material.

Figure 31:
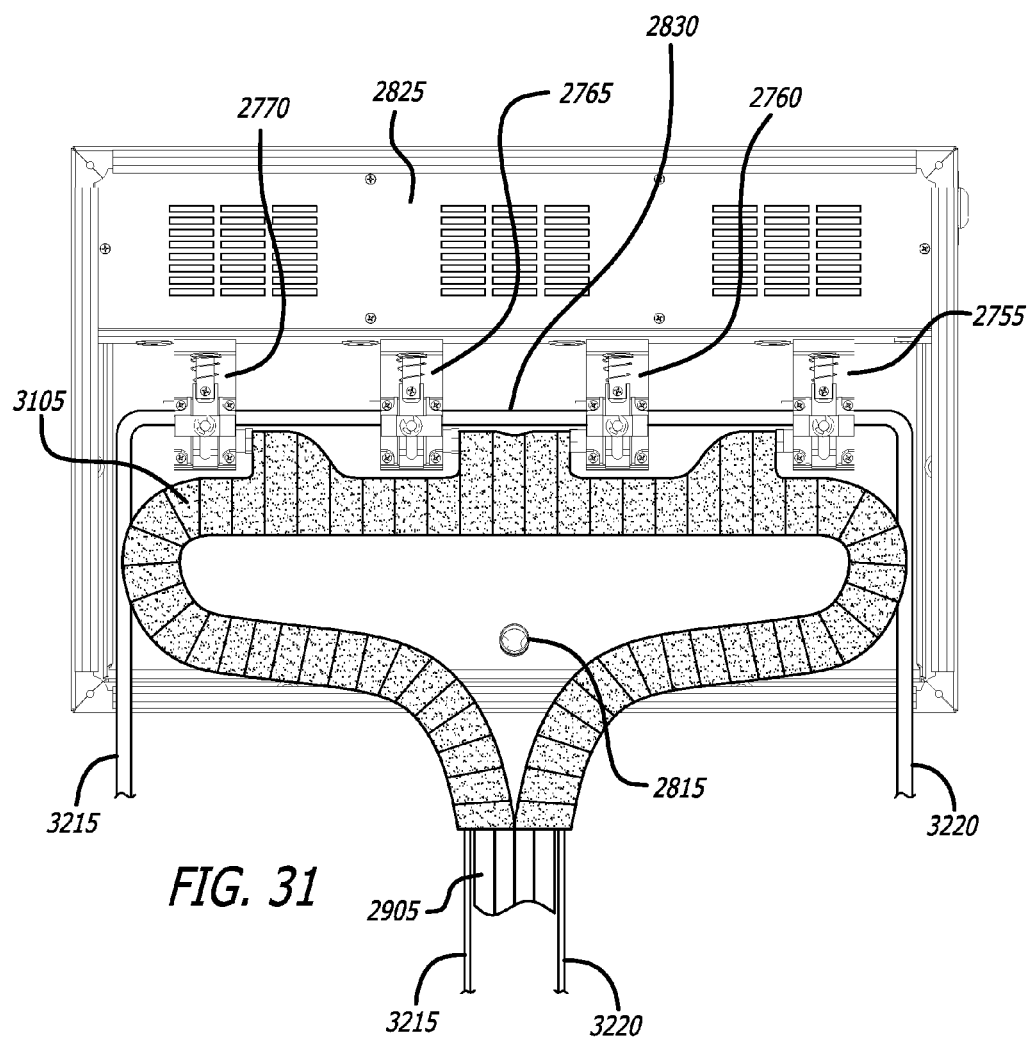
FIG. 31 illustrates a representative bottom view of a dispensing system showing the source tubes with a second layer of insulation, in accordance with some embodiments.

FIG. 31 illustrates a representative bottom view of a dispensing system showing the source tubes with a second layer of insulation, in accordance with some embodiments. As illustrated, the second layer of insulation 3105 may wrap around portions of the source conduits 2905 that are within the dispensing system housing and portions of the source conduits 2905 that extend partially outside of the dispensing system housing. For one embodiment, the second layer of insulation 3105 may include a layer of foam material. Insulating tapes may be used to keep the first insulation layer 3005 and the second insulation layer 3105 together with the source conduit 2905. Other insulation materials and usage combinations may also be used.

Figure 32:
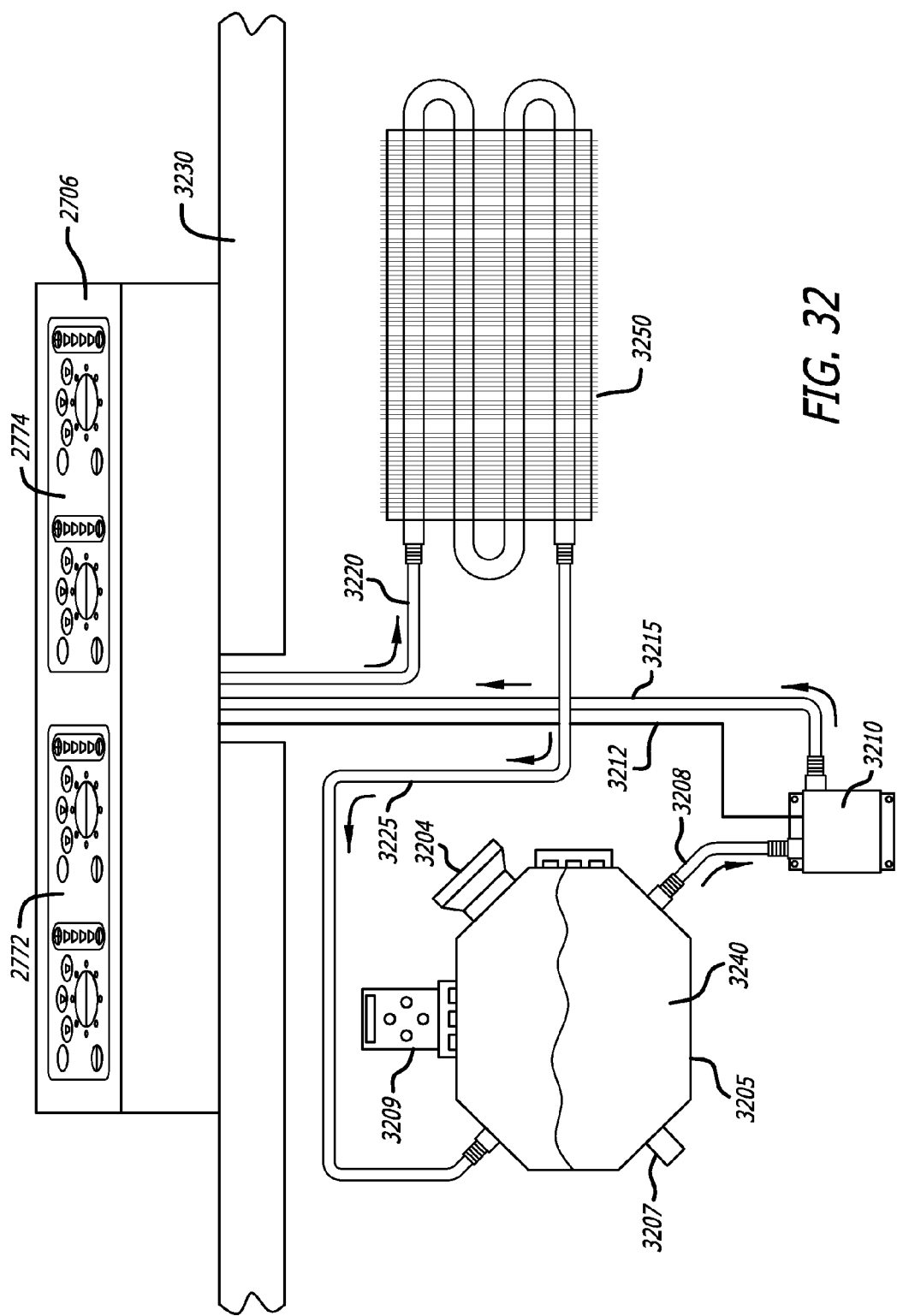
FIG. 32 illustrates a representative cooling system showing how the temperature of the source fluid can be controlled during transport, in accordance with some embodiments.

FIG. 32 illustrates a representative cooling system showing how the temperature of the source fluid can be controlled during transport, in accordance with some embodiments. The cooling system may include a cooled or cold liquid. Liquid 3240 may be, for example, glycol, water or saline solution chilled or iced, or other cold liquid. The liquid 3240 (e.g., glycol) may help keep the source fluid (e.g., beer) chilled all the way up to the point of dispense. The liquid 3240 may be held in a tank or container 3205. The tank 3205 may be filled or partially filled with the cooling liquid. The tank 3205 may include an inlet 3204 and an outlet 3207. The tank 3205 may also include a first coupler to couple with an in-coming fluid conduit 3225 and another coupler to couple with out-going fluid conduit 3208. The tank 3205 may also include a monitoring device 3209 for monitoring purposes including, for example, level of the liquid 3240 inside the tank 3205, temperature of the liquid 3240, etc. For one embodiment, the cooling system may be portable and may include an ice bath to submerge (fully or partially) and chill the tank 3205 and the liquid 3240.

Pump 3210 may be used to pump the liquid 3240 from the tank 3205. The pump 3210 may be powered using the same power source that is used to power the dispensing system, or it may use a separate power source. Power is delivered to the pump 3210 via power line 3212. The pump 3210 may be used to circulate the liquid 3240 through a system of cooling conduits including the conduit 2830 illustrated in FIG. 28. For example, the out-going conduit 3208 is used to transport the liquid 3240 from the tank 3205 to the pump 3210. Conduit 3215 is used to transport the liquid 3240 from the tank 3205 to the dispensing system. The conduit 2830 is used to transport the liquid 3240 though the dispensing system by being connected to the valves 2755, 2760, 2765, and 2770. Conduit 3220 is used to transport the liquid 3240 away from the dispensing system to be cooled by fan and/or radiator 3250. The conduit 3220 may be coupled to the radiator 3250 via an in-coming coupler of the radiator 3250. The in-coming conduit 3225 is used to transport the liquid 3240 from the fan and/or radiator 3250 back to the tank 3205. The in-coming conduit 3225 may be coupled to the radiator 3250 via an out-going coupler of the radiator 3250. Illustrated in FIG. 32 are directional arrows that show the directions of the liquid 3240 along each of the mentioned conduits.

The conduit 3215 may run along the source conduits 2905 to maintain the fluid at the desired temperature during transport. The conduit 3215 may run parallel to the source conduits 2905, circumferentially surround the source conduits 2905 (for example, coils), or combinations thereof (for example, helical line).

In one embodiment, the conduits 3215, 3220, and 3225 may be made of stainless steel or copper or other material of high thermal conductivity. In one embodiment, temperature regulated air may be used to maintain the conduit 3215 and the source conduits 2905 at a desired temperature. For example, the fluid source 2405 may be housed within a refrigeration unit to maintain the fluid at a desired temperature. A cooled air line may then be used with the conduit 3215 to maintain the temperature of the fluid from the fluid source 2405 to the dispensing system during transport.

The dispensing system may be placed on an existing counter top or may be incorporated into a counter or serving surface 3230. Alternatively, the dispensing system may be provided as components that can be incorporated into a serving area as required by the location. In one embodiment, the dispensing system may include areas where information can be displayed and visible. For example, images, graphics, product logos, customer icons, etc. may be displayed in any area of the first front wall 2705. The information may be integrated into the some of the functions of the valve including, for example, the on/off or start/stop mechanisms. The information may be displayed for purely aesthetic purposes. For example, the customer icon may be the traditional beer taps associated with the beers dispensed by the dispensing system.

Figure 33:
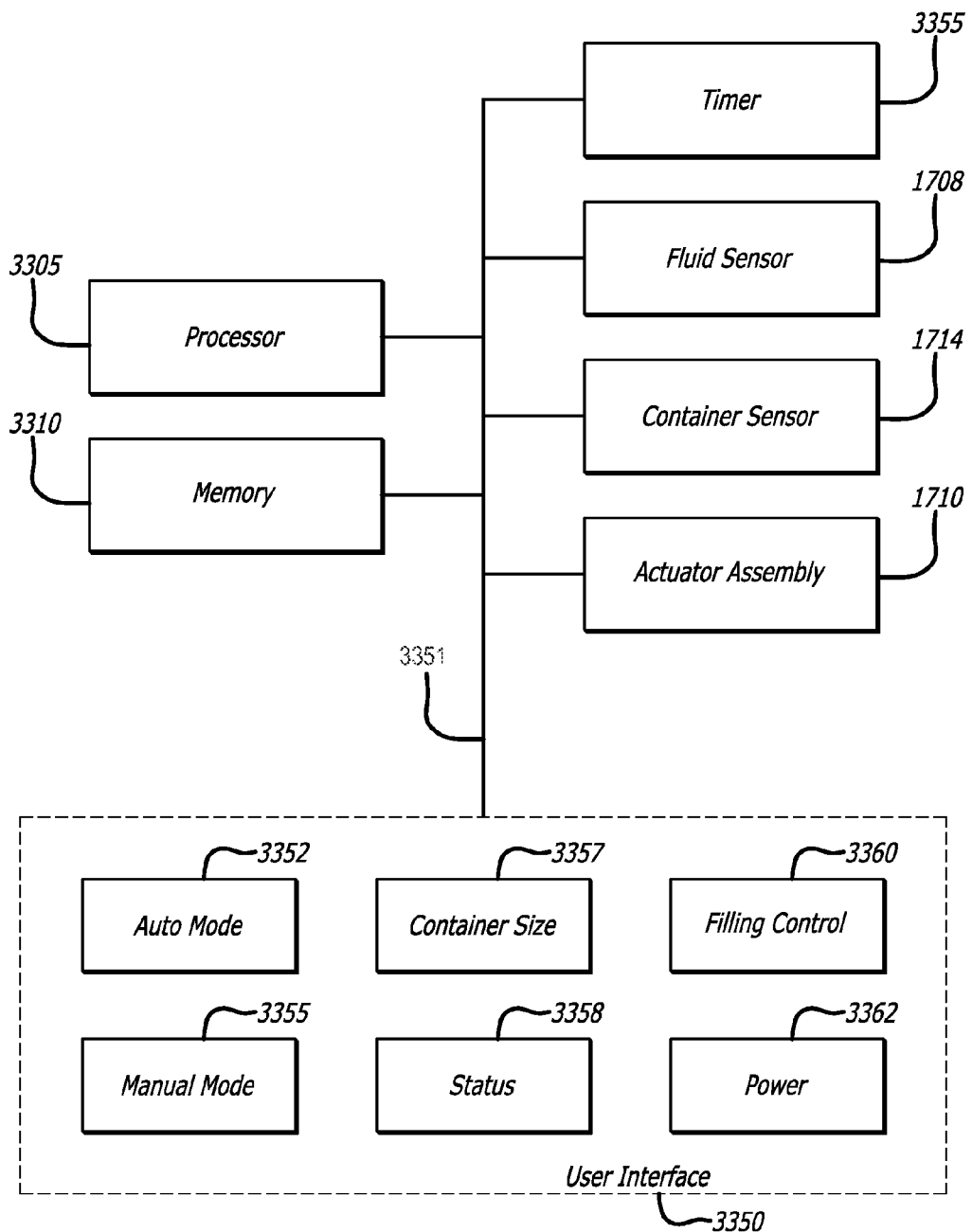
FIG. 33 illustrates a representative dispensing logic diagram, in accordance with some embodiments.

FIG. 33 illustrates a representative dispensing logic diagram that may be used by the dispensing system, in accordance with some embodiments. The dispensing system may include dispensing logic to control electrical and mechanical components. The dispensing logic may be performed by hardware (circuitry, dedicated logic, state machines, etc.), software (such as is run on a general purpose computer system or dedicated machine), or combinations of both. The dispensing logic may be implemented with combinational logic and finite state machines. The dispensing logic may include application specific integrated chip (ASIC), a field programmable gate array (FPGA), or processors, or any combination thereof. Software may be used and may include machine instructions. Information may be received from peripheral devices. Information may be displayed on the peripheral devices.

Referring to FIG. 33, the dispensing logic may include a processor 3305 and memory 3310 that may be configured to store information and instructions. The dispensing logic may include electrical circuits including bus 3351 that allows information to be sent by and to the processor 3305. Information may be sent to the processor 3305 by the container sensor 1714 to indicate proper placement of a fluid container. Information may also be sent to the processor 3305 by the fluid sensor 1708 to indicate the amount of fluid flow based on the rotation of the turbine 2327. A timer 3355 may be used to determine flow times and rates. The processor 3305 may send information to the actuator assembly 1710 to cause the solenoid 1706 in the actuator assembly 1710 to move and cause the fluid to flow. The memory 3310 may store instructions and/or information that allow the processor 3305 to calculate and determine the volume of the fluid to be dispensed to a fluid container.

The processor 3305 may receive information from and may display information on a user interface 3350. The implementation of the user interface 3350 may includes an auto mode module 3352 to allow a user to set the automatic filling mode, a manual mode module 3255 to allow the user to set the manual filling mode. The user interface 3350 may also include the container size module 3357 to allow the user to specify the size or volume of the fluid container to receive the fluid, and the filling control module 3360 to allow the user to adjust the volume to be dispensed to the fluid container. Power module 3362 may be used to power on or power off the dispensing system. Status module 3358 may be used to display status information to the user. This may include information about the dispensing system being ready to dispense or not ready to dispense. Although not described, the dispensing logic may also include other modules to enable the dispensing system to dispense the fluid into the fluid container according to the embodiments described herein.

Figure 34:
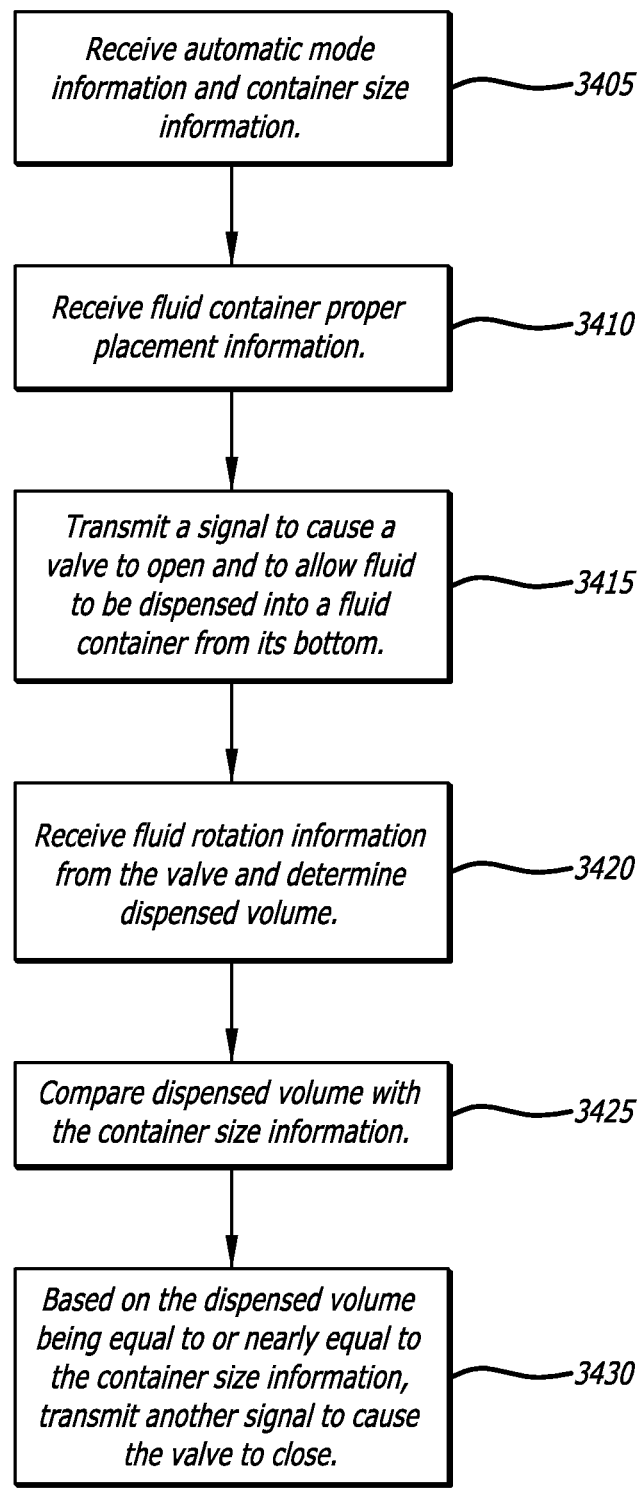
FIG. 34 illustrates a representative dispensing flow diagram, in accordance with some embodiments.

FIG. 34 illustrates a representative dispensing flow diagram, in accordance with some embodiments. The flow diagram may be applicable when the dispensing system is set to run in the automatic mode. The flow may start at block 3405 where automatic mode information and container size information is received. When applicable, filling level information may also be received. In one embodiment, the automatic mode information and the container size information may be received in any order when no fluid has yet been dispensed.

At block 3410, proper fluid container placement information may be received after a fluid container is placed in contact with the valve on the dispensing platform. Proper placement of the container may require a mating plate positioned on the bottom of the fluid container to mate with a mating plate positioned on the nozzle 1705. As mentioned, the mating plate positioned on the bottom of the fluid container may include a magnet. At block 3415, a signal may be transmitted to cause the valve to open, to open a fluid flow path from the valve to the fluid container, and to allow the fluid to be dispensed into the fluid container from the bottom of the fluid container. The signal may cause the solenoid 1706 in the valve assembly 1710 to move and the plunger 2326 to open. At block 3420, rotation information may be received. The rotation information may be information relating to detecting a rotation of the turbine 2327. The detection may be performed by the fluid sensor 1708. A magnet may be positioned on a fin of the turbine 2327, and the fluid sensor 1708 may be a Hall effect sensor. Based on the rotation information and information from a timer, dispensed volume may be determined.

At block 3425, the determined dispensed volume may be compared with the container size information (and filling level information when applicable). When the determined dispensed volume is less than the container size information, the flow of the fluid into the fluid container may be allowed to continue, and the comparing operations may repeat. It may be difficult to dispense exactly the amount of fluid desired. For one embodiment, a threshold may be used to determine when to stop the flow of the fluid. At block 3430, based on the dispensed volume being equal to or nearly equal to the container size information (or within the threshold), the flow of the fluid into the fluid container may be stopped. This may include transmitting another signal to the valve and cause the plunger 2326 to close. Once a filled fluid container is removed from the dispensing platform, information may be received to allow the dispensing system to reset and be in a ready state to fill another fluid container or to flush/clean between uses. In one embodiment, the flow diagram described above may be adjusted to accommodate the semi-automatic dispensing mode by selecting the stop option 2792 during the operations of the block 3425 to stop the fluid flow prior to the fluid container being filled.

While some specific embodiments have been described herein, the invention is not to be limited to these embodiments. The invention is to be understood as not limited by the specific embodiments described herein, but only by scope of the appended claims. Features and details from one or more described embodiments may also be combined, added, or removed to form other embodiments within the scope of the invention, as the described embodiments are merely exemplary of various features considered novel and within the scope of the invention. Embodiments of the invention may be used where a constant seal between a container and the source of a non-solid (e.g., fluid or liquid) material needs to be maintained. Embodiments of the invention may permit the container to be repeatedly coupled to (without breaching the seal of the container) and then removed from the source.

Although embodiments of the invention are described and illustrated herein in terms of liquid, beverage, or beer dispensers, it should be understood that embodiments of this invention are not so limited, but are additionally applicable with other liquids and substances. In the embodiments implementing magnetic materials, the dispensers are preferably used with substances that would not interfere with the magnetic interaction of one or more components (e.g., non-ferrous substances). Furthermore, although embodiments of the invention may be described and illustrated herein in terms of filling a container from its bottom, it should be understood that embodiments of the invention are also applicable to filling from a bottom portion of the container. The term "bottom" should generally be understood to include any lower portion of the container such that entry of the filling liquid is generally from under the surface of the liquid in the container for at least a later part of the filling processes. For example, the "bottom" may include a side of the container where initially the filling process will be above the surface of the liquid in the container, but if the container is filled to capacity, the filling process will be under the surface of the container liquid for a later part of the filling process. Embodiments of the invention may also be used for filling a closed container from a top portion thereof.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. For example, specific examples are provided for shapes and materials; however, embodiments include those variations obvious to a person skilled in the art, such as changing a shape or combining materials together. For example, specific examples include a magnetic material or ferrous metal included in a ring in either the container or beverage dispenser, but the embodiment is not so limited, and may include a magnetic material combined in the container or dispenser, such as by using blocks, pellets, or other variations. Further, embodiments disclosed herein generally describe a beverage dispenser for creating a fluid flow path and a separate valve to creating the fluid flow, however, these features may be combined into a single device. The term "coupled" is intended to include direct and indirect attachment between the coupled parts. Further, embodiments herein describe electrical and mechanical components for an exemplary valve system. Embodiments include those variations obvious to a person skilled in the art, such as changing out electrical and mechanical components to effect the same result. Specific embodiments are also described for a dispenser system, including housing, user input device, and customer icons which may be modified, eliminated, or combined as would be apparent to one of skill in the art. Features as described herein may be used in any combination and are not limited to the embodiments in which they are described. Thus, embodiments may include additional features or may eliminate features as desired by the specific application.

What is claimed is:

1. A fluid dispensing assembly, comprising:
   a valve for dispensing a fluid to a fluid container coupled to the valve at a bottom of the fluid container, the valve comprising:
   a first sensor detecting proper placement of the fluid container based on a magnetic material positioned at the bottom of the fluid container;
   a plunger having a plunger shaft coupled thereto, the plunger selectively placing the valve in fluid communication with the fluid container; and
   a solenoid coupled to the plunger shaft and moving the plunger shaft to transition the plunger between an open position and a closed position; and
   a user interface coupled to the valve enabling selection of at least a fluid container size and a dispensing mode.

2. The fluid dispensing assembly according to claim 1, wherein the valve further comprises a second sensor detecting rotation of a turbine in the valve based on a magnetic material positioned on a fin of the turbine, wherein a rotation number of the turbine within an amount of time is used to determine a volume of fluid dispensed to the fluid container.

3. The fluid dispensing assembly according to claim 2, wherein the rotation of the turbine is caused by the fluid flowing from a fluid source through the valve.

4. The fluid dispensing assembly according to claim 1, wherein the valve further comprises a nozzle including a first mating plate that mates with a second mating plate positioned at the bottom of the fluid container when the fluid container is properly positioned, the second mating plate including the magnetic material.

5. The fluid dispensing assembly according to claim 1, wherein the valve further comprises a fitting coupled to a fluid source that contains the fluid to be dispensed to the fluid container through the valve.

6. The fluid dispensing assembly according to claim 1, wherein the dispensing mode includes a manual dispensing mode and an automatic dispensing mode.

7. The fluid dispensing assembly according to claim 1, wherein the user interface includes an option to adjust filling volume, an option to power on or power off, and options for cleaning and priming.

8. The fluid dispensing assembly according to claim 1, further comprising a housing coupled to the valve and the user interface, the housing including a filling area, a drain opening, at least one valve opening, and a user interface area to accommodate the user interface.

9. The fluid dispensing assembly according to claim 8, wherein the housing includes a compartment to accommodate electronic components associated with the user interface and the valve.

10. The fluid dispensing assembly according to claim 8, wherein the housing is coupled to a dispensing platform elevated above the filling area and including openings to allow fluid spillage to transfer from the dispensing platform to the filling area.

11. The fluid dispensing assembly according to claim 10, wherein the housing includes a display area to display promotional information.

* * * * *